US012621847B2

(12) United States Patent
Woo et al.

(10) Patent No.: US 12,621,847 B2
(45) Date of Patent: May 5, 2026

(54) ELECTRONIC DEVICE CAPABLE OF CONTROLLING NEIGHBORING DEVICE AND METHOD FOR CONTROLLING THE SAME

(71) Applicant: SAMSUNG ELECTRONICS CO., LTD., Suwon-si (KR)

(72) Inventors: Youngchan Woo, Suwon-si (KR); Jihye Kwon, Suwon-si (KR); Joayoung Lee, Suwon-si (KR); Miyoung Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 343 days.

(21) Appl. No.: 18/226,970

(22) Filed: Jul. 27, 2023

(65) Prior Publication Data

US 2024/0137953 A1    Apr. 25, 2024
US 2024/0237030 A9    Jul. 11, 2024

Related U.S. Application Data

(63) Continuation of application No. PCT/KR2023/010479, filed on Jul. 20, 2023.

(30) Foreign Application Priority Data

Oct. 24, 2022    (KR) ........................ 10-2022-0137685

(51) Int. Cl.
*H04W 72/25* (2023.01)
*G06F 3/0482* (2013.01)
*G06F 9/54* (2006.01)

(52) U.S. Cl.
CPC .......... *H04W 72/25* (2023.01); *G06F 3/0482* (2013.01); *G06F 9/54* (2013.01)

(58) Field of Classification Search
CPC ........ H04W 72/25; G06F 3/0482; G06F 9/54; G06F 3/04842; G06F 3/04845; H04L 12/28; H04L 12/282; H04L 12/281
See application file for complete search history.

(56) References Cited

U.S. PATENT DOCUMENTS 8,918,738 B2    12/2014    Yoshitomi et al.
9,317,190 B2     4/2016    Kwak et al.
(Continued)

FOREIGN PATENT DOCUMENTS

EP        3 751 405 A1    12/2020
JP        2010-250554     11/2010
(Continued)

OTHER PUBLICATIONS

PCT/ISA/210 dated Oct. 26, 2023 in International Patent Application No. PCT/KR2023/010479.
(Continued)

*Primary Examiner* — Edan Orgad
*Assistant Examiner* — Samuel Roberge Bettendorf
(74) *Attorney, Agent, or Firm* — STAAS & HALSEY LLP

(57)    ABSTRACT

A mobile device and a method of controlling the same. A control method according to an embodiment comprises displaying a user interface (UI) screen which includes a plurality of UI elements, detecting a first user input associated with a first UI element among the plurality of UI elements, identifying one or more identification codes associated with the first UI element based on the detecting of the first user input, detecting one or more neighboring devices based on the one or more identification codes, displaying a window which includes one or more UI elements associated with the one or more neighboring devices, detecting a second user input associated with a second UI element
(Continued)

among the one or more UI elements, determining a neighboring device associated with the second UI element, among the one or more neighboring devices, as a controlled device controllable through the second UI element, based on detecting of the second user input, and transmitting a control command related to the first UI element to the neighboring device determined as the controlled device.

20 Claims, 17 Drawing Sheets

(56) References Cited

U.S. PATENT DOCUMENTS

| | | | |
|---|---|---|---|
| 9,430,057 | B2 | 8/2016 | Kwak et al. |
| 9,465,453 | B2 | 10/2016 | Kwak et al. |
| 9,817,486 | B2 | 11/2017 | Kwak et al. |
| 9,823,756 | B2 | 11/2017 | Kwak et al. |
| 9,898,163 | B2 | 2/2018 | Yoshitomi et al. |
| 9,977,516 | B2 | 5/2018 | Kwak et al. |
| 10,091,272 | B2 | 10/2018 | Cho et al. |
| 10,318,120 | B2 | 6/2019 | Kwak et al. |
| 10,353,661 | B2 | 7/2019 | Choi et al. |
| 10,440,803 | B2 | 10/2019 | Kim |
| 10,452,333 | B2 | 10/2019 | Jeong et al. |
| 10,599,296 | B2 | 3/2020 | Yoshitomi et al. |
| 10,635,379 | B2 | 4/2020 | Choi et al. |
| 10,684,813 | B2 | 6/2020 | Kim et al. |
| 10,691,313 | B2 | 6/2020 | Kwak et al. |
| 10,809,902 | B2 | 10/2020 | Park et al. |
| 10,992,795 | B2 | 4/2021 | Coffman et al. |
| 11,019,130 | B2 | 5/2021 | Cho et al. |
| 11,366,517 | B2 | 6/2022 | Alcaide et al. |
| 11,372,612 | B2 | 6/2022 | Kim et al. |
| 11,409,327 | B2 | 8/2022 | Kwak et al. |
| 11,487,417 | B2 | 11/2022 | Park et al. |
| 2015/0128067 | A1 | 5/2015 | Wong et al. |
| 2016/0249177 | A1* | 8/2016 | Sandel .................. H04L 67/306 |
| 2019/0156278 | A1* | 5/2019 | Matson .................... B25F 5/00 |
| 2019/0387945 | A1 | 12/2019 | Kim |
| 2020/0022072 | A1 | 1/2020 | Cho et al. |
| 2020/0162885 | A1* | 5/2020 | Coulis .................. H04W 76/10 |
| 2020/0285377 | A1 | 9/2020 | Hoefs et al. |
| 2020/0379729 | A1 | 12/2020 | Graham et al. |
| 2020/0379730 | A1 | 12/2020 | Graham et al. |
| 2020/0413197 | A1 | 12/2020 | Carrigan et al. |
| 2021/0272447 | A1* | 9/2021 | Tchedikian ......... G06F 3/04883 |

FOREIGN PATENT DOCUMENTS

| | | |
|---|---|---|
| KR | 10-2015-0022254 | 3/2015 |
| KR | 10-2015-0028008 | 3/2015 |
| KR | 10-2015-0103294 | 9/2015 |
| KR | 10-1584590 | 1/2016 |
| KR | 10-1588294 | 1/2016 |
| KR | 10-1595969 | 2/2016 |
| KR | 10-2016-0109976 | 9/2016 |
| KR | 10-2017-0022679 | 3/2017 |
| KR | 10-2017-0059881 | 5/2017 |
| KR | 10-2017-0078106 | 7/2017 |
| KR | 10-2269481 | 6/2021 |
| KR | 10-2021-0118958 | 10/2021 |
| KR | 10-2022-0027295 | 3/2022 |
| KR | 10-2373451 | 3/2022 |
| WO | WO 2017/218192 A1 | 12/2017 |
| WO | WO 2022/159899 A1 | 7/2022 |
| WO | WO 2022/159899 A9 | 7/2022 |

OTHER PUBLICATIONS

PCT/ISA/237 dated Oct. 26, 2023 in International Patent Application No. PCT/KR2023/010479.
Xu et al.; Method for Estimating the Distance Between Multiple IMU- Based Wearable Devices; 2016 IEEE MTT-S International Wireless Symposium (IWS), XP032976820, (Mar. 24, 2016).
Extended European Search Report issued Nov. 4, 2025 for Application No. 23882833.9.

* cited by examiner

| MEMORY | ~101 |
| PROCESSOR | ~102 |
| TRANSCEIVER | ~103 |
| ADDITIONAL COMPONENT (E.G., DISPLAY, SPEAKER, OR MICROPHONE) | ~104 |

FIG.3

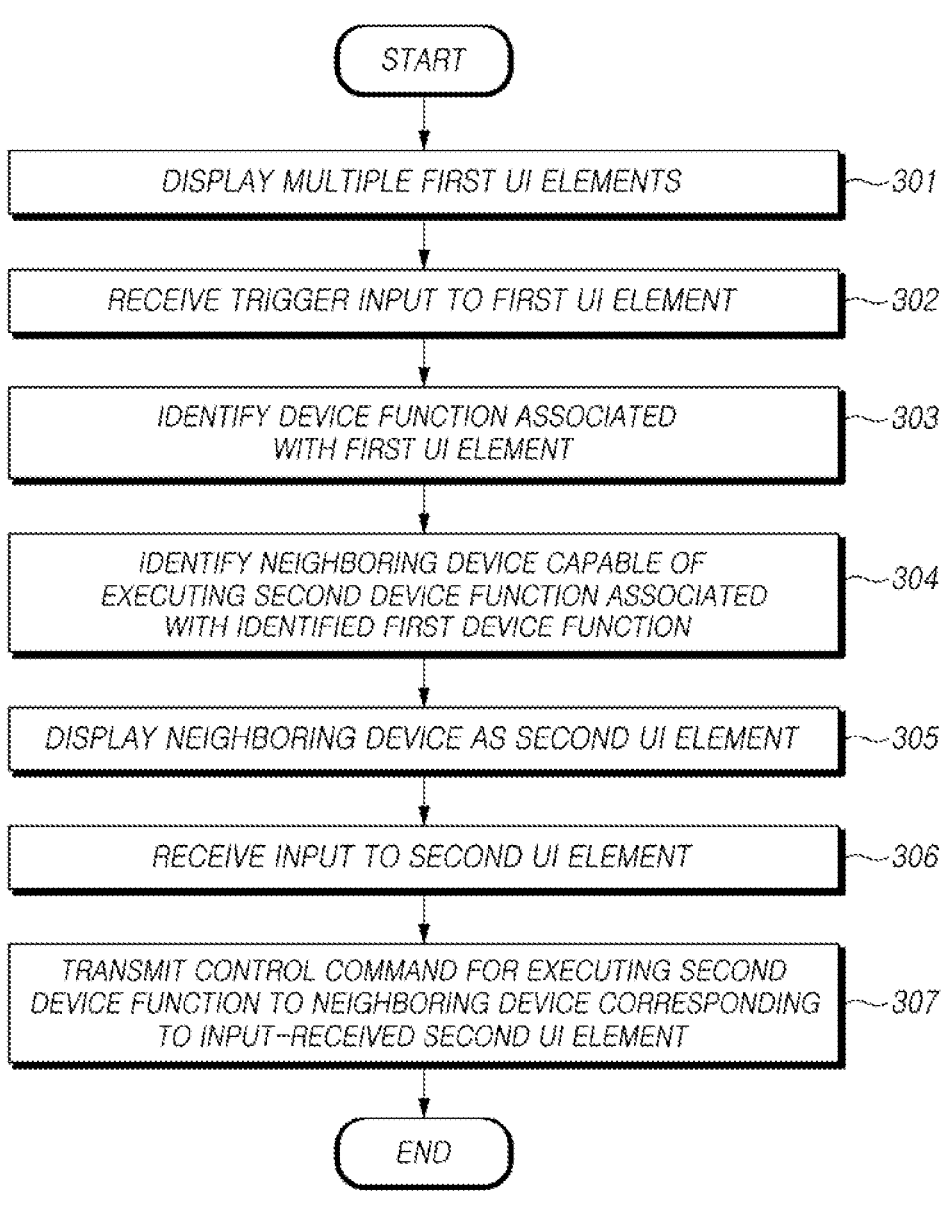

START

DISPLAY MULTIPLE FIRST UI ELEMENTS — 301

RECEIVE TRIGGER INPUT TO FIRST UI ELEMENT — 302

IDENTIFY DEVICE FUNCTION ASSOCIATED WITH FIRST UI ELEMENT — 303

IDENTIFY NEIGHBORING DEVICE CAPABLE OF EXECUTING SECOND DEVICE FUNCTION ASSOCIATED WITH IDENTIFIED FIRST DEVICE FUNCTION — 304

DISPLAY NEIGHBORING DEVICE AS SECOND UI ELEMENT — 305

RECEIVE INPUT TO SECOND UI ELEMENT — 306

TRANSMIT CONTROL COMMAND FOR EXECUTING SECOND DEVICE FUNCTION TO NEIGHBORING DEVICE CORRESPONDING TO INPUT-RECEIVED SECOND UI ELEMENT — 307

END

ELECTRONIC DEVICE CAPABLE OF CONTROLLING NEIGHBORING DEVICE AND METHOD FOR CONTROLLING THE SAME

CROSS-REFERENCE TO RELATED APPLICATIONS

This application is a continuation application of International Application No. PCT/KR2023/010479 designating the United States, filed on Jul. 20, 2023, in the Korean Intellectual Property Receiving Office, which claims priority from Korean Patent Application No. 10-2022-0137685, filed on Oct. 24, 2022, in the Korean Intellectual Property Office, the disclosures of which are hereby incorporated by reference herein in their entireties.

BACKGROUND

Field

The disclosure relates to an electronic device capable of controlling a neighboring device and a method for controlling the same.

Description of Related Art

Electronic device sellers provide consumers with a control device for manipulating the state of the electronic device. For example, a TV remote controller is provided for a TV, and an air conditioner remote controller is provided for an air conditioner. Although different types of electronic devices have the same or similar functions, a typical remote controller may control only pre-defined electronic devices. As types of electronic devices for home use increase, more remote controllers are required to control the electronic devices.

SUMMARY

According to an aspect of the disclosure, a method of controlling a neighboring device by a mobile device comprises: displaying a user interface (UI) screen which includes a plurality of UI elements, detecting a first user input associated with a first UI element among the plurality of UI elements, identifying one or more identification codes associated with the first UI element based on the detecting of the first user input, detecting one or more neighboring devices based on the one or more identification codes, displaying a window which includes one or more UI element associated with the one or more neighboring devices, detecting a second user input associated with a second UI element among the one or more UI elements, determining a neighboring device associated with the second UI element, among the one or more neighboring devices, as a controlled device controllable through the second UI element, based on the detecting of the second user input, and transmitting a control command related to the first UI element to the neighboring device determined as the controlled device.

According to an embodiment, the one or more identification codes include(s) a device code, a function code, and a mapping code.

According to an embodiment, in case that a number of the one or more neighboring devices is multiple, function codes of the multiple neighboring devices are the same, and device codes of the multiple neighboring devices are different.

According to an embodiment, the mapping code is associated with a component type of the first UI element.

According to an embodiment, the method further comprises performing a device function corresponding to the first UI element based on detecting a third user input associated with the first UI element, different from the first user input.

According to an embodiment, the window is any one of a map-type window, a modal-type window, a bar-type window, or a list-type window.

According to an embodiment, in response to the window being the map-type window, the one or more UI elements are displayed on the map-type window, and a display position of each of the one or more UI elements is determined based on at least one of a distance between the mobile device and each of the one or more neighboring devices or a position of each of the one or more neighboring devices.

According to an embodiment, the first UI element at least partially overlaps the map-type window.

According to an embodiment, the map-type window includes a plurality of iso-level lines. The first UI element is positioned in a center of the plurality of iso-level lines.

According to an embodiment, the method further comprises identifying the distance between the mobile device and each of the one or more neighboring devices or the position of each of the one or more neighboring devices by using an inertial measurement unit (IMU) sensor and a transceiver included in the mobile device.

According to an embodiment, in response to the window being any one of the modal-type window, the bar-type window, or the list-type window, the one or more UI elements are arranged based on priority of each of the one or more UI elements. The priority of each of the one or more UI elements is determined based on at least one of a distance between the mobile device and each of the one or more neighboring devices or a position of each of the one or more neighboring devices.

According to an embodiment, a badge indicating a number of devices associated with at least one UI element of the one or more UI elements is coupled to at least one UI element.

According to an embodiment, the method further comprises determining one or more neighboring devices associated with a third UI element among the at least one UI element to which the badge is coupled, as one or more controlled devices controllable through the third UI element, based on detecting a fourth user input associated with the third UI element.

According to an embodiment, the method further comprises displaying an additional list-type window for indicating at least some of one or more neighboring devices associated with a third UI element among the at least one UI element to which the badge is coupled, based on detecting a fifth user input associated with the third UI element.

A mobile device according to an embodiment comprises a display, one or more memories, one or more transceivers, and one or more processors. The one or more processors are configured to control display to display a user interface (UI) screen which includes a plurality of the first UI elements, detect a first user input associated with the first UI element among the plurality of UI elements, identify one or more identification codes associated with the first UI element based on the detecting of the first user input, detect one or more neighboring devices based on the one or more identification codes, control the display to display a window which includes one or more UI elements associated with the one or more neighboring devices, detect a second user input associated with a second UI element among the one or more UI elements, determine a neighboring device associated with the second UI element, as a controlled device controllable through the second UI element, based on the detecting of the second user input, and control the one or more transceivers to transmit a control command related to the first UI element to the neighboring device determined as the controlled device.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an example electronic device according to the wireless communication system of FIG. 1 according to an embodiment of the disclosure;

FIG. 3 is a flowchart illustrating a control method according to an embodiment of the disclosure;

Figure 1:
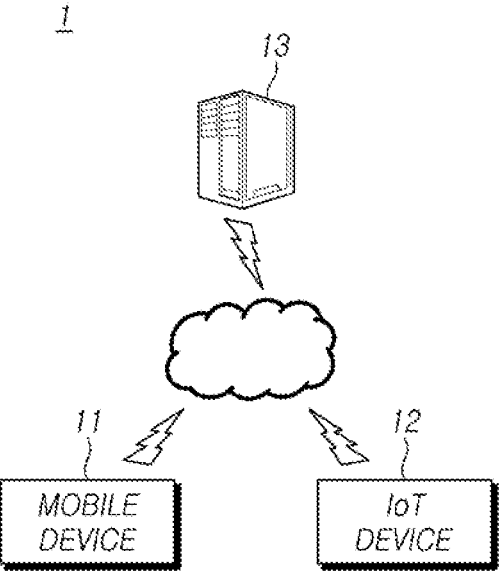
FIG. 1 illustrates a wireless communication system according to an embodiment of the disclosure.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

The disclosure provides a method capable of automatically identifying a plurality of electronic devices capable of executing the same or similar functions and conveniently controlling a plurality of electronic devices having the same or similar functions by a remote control device (e.g., a user device or a mobile device). The disclosure also provides an electronic device capable of implementing the method.

According to an embodiment, the user easily executes functions of other electronic devices for which function manipulation is cumbersome by applying a predetermined user input to a mobile device capable of easily manipulating various functions.

FIG. 1 illustrates a wireless communication system according to an embodiment of the disclosure.

The wireless communication system 1 includes a mobile device 11, a base station (not shown), and a network. The mobile device 11 means an electronic device that performs communication by radio access technology (e.g., 5G NR or LTE), and may be referred to as a communication/mobile device 11. Although not limited thereto, the mobile device 11 may include a robot, a vehicle, an extended reality (XR) device, a portable device, a home appliance, an IoT (Internet of Things) device 12, and an AI device.

The mobile device 11 may be connected to the network through the base station. The mobile device 11 may adopt artificial intelligence (AI) technology and may be connected to an AI service server capable of providing AI services through the network.

The network may be configured as a 3G/4G/5G/6G network or the like. Mobile devices 11 may communicate with each other via the base station or network or directly (e.g., side-link communication) without passing through the base station or network.

According to an embodiment, the AI service server 13 may include an IoT service server. More specifically, the IoT service server may include a content recommendation server for recommending media content to the mobile device 11, a text-to-speech (TTS) server for analyzing user utterance, and a speech-to-text (STTP server for synthesizing text into voice. Further, the AI service server 13 may include a natural language processing (NLP) server or a natural language understanding (NLU) server for identifying the user's intent from the user utterance.

The IoT device 12 may receive a control command from the mobile device 11 or the service server 13. For example, the IoT device 12 may operate a predetermined function based on receiving a control command received from the mobile device 11. Further, the IoT device 12 may operate a predetermined function based on receiving a control command from the service server 13. Although not limited thereto, the IoT device 12 may have a function table stored in a memory for a function operation based on receiving a control command, as described above. The function table may be composed of data sets of control commands and functions associated with the control commands, which are mapped with each other. According to an embodiment, the function table may be referred to as a mapping table.

Various AI service servers 13 and mobile device(s) 11 that may be included in the wireless communication scheme 1 according to the disclosure may commonly include one or more memories, one or more transceivers, and one or more processors. Components of an electronic device applicable to the mobile device(s) 11 and the service server(s) 13 according to an embodiment of the disclosure are described below with reference to FIG. 2.

Figure 2:
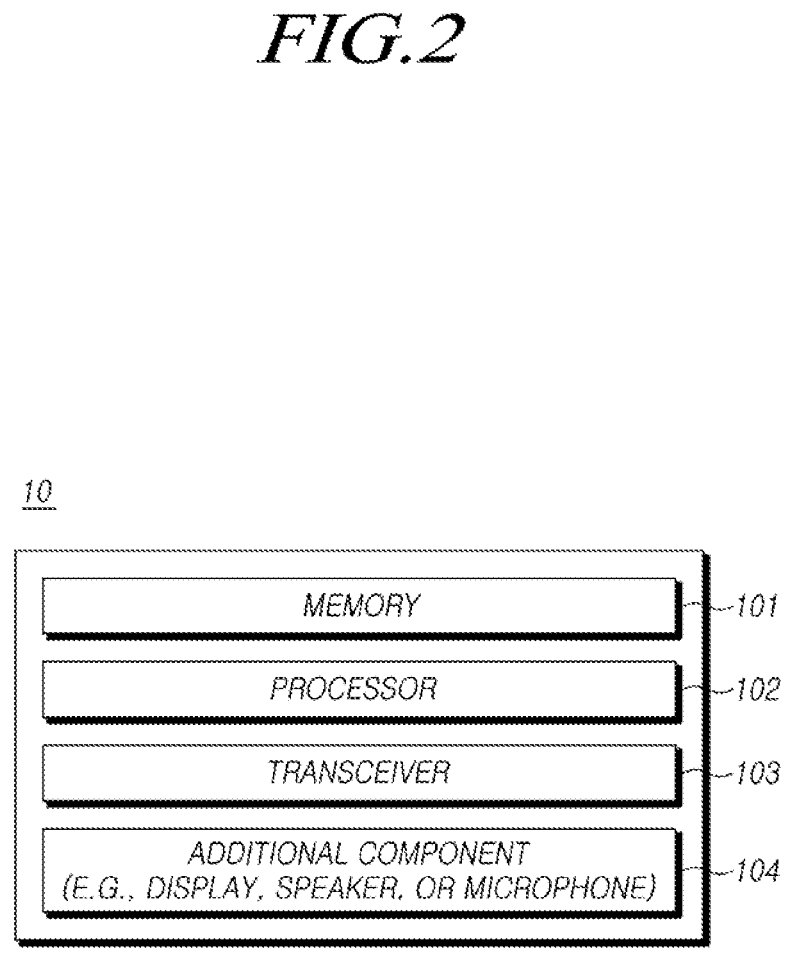

FIG. 2 illustrates an example electronic device of the wireless communication system of FIG. 1.

The electronic device 10 according to various embodiments of the disclosure may include a processor 102, a memory 101, and a transceiver 103. The memory 101 and the transceiver 103 may be electrically or functionally connected to the processor 102. The processor 102 may control components constituting the electronic device 10 by generating and transmitting a control command.

According to various embodiments of the disclosure, the processor 102 may include a storage and processing circuit unit for supporting the operation of the electronic device 10. The storage and processing circuit unit may include storage, such as non-volatile memory 101 (e.g., flash memory, and other electrically programmable ROM configured to form a solid-state drive (SSD)) or volatile memory (e.g., static and dynamic RAM). The processing circuit unit in the processor 102 may be used to control the operation of the electronic device 10. The processing circuit unit may be based on one or more microprocessor(s), microcontroller(s), digital signal processor(s), baseband processor(s), power management section(s), audio chip(s), or application specific integrated circuit(s).

According to various embodiments of the disclosure, the memory 101 may include a memory area for one or more processors 102 for storing variables used in the protocol, configuration, control, and other functions of the electronic device 10, including operations corresponding to or including any one of the methods and/or procedures described as an example According to an embodiment. Further, the memory 101 may include non-volatile memory, volatile memory, or a combination thereof. Further, the memory 101 may interface with a memory slot that enables insertion and removal of removable memory cards in one or more formats (e.g., SD card, Memory stick, and compact flash).

According to various embodiments of the disclosure, the transceiver 103 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or modem for connecting the electronic device 10 with a network (e.g., Internet, LAN, WAN, telecommunication network, cellular network, satellite network, POTS and 5G network). The RF module may be responsible for data transmission/reception, e.g., transmitting and receiving data RF signals or invoked electronic signals. As an example, the RF module may include, e.g., a power amp module (PAM), a frequency filter, or a low noise amplifier (LNA). The RF module may further include parts (e.g., conductors and wires) for communicating radio waves in a free space upon performing wireless communication.

A control method performed by a mobile device is described. Each operation of the control method may be performed by one or more processors provided in the mobile device. Further, the operation order of the control method is not limited to the order described or the order illustrated with reference to the drawings, and the order may be changed.

According to an embodiment, the term "user interface (UI) element" refers to a component of a user interface graphically represented on a display. Specifically, the UI element of the disclosure may be understood as a virtual button or a virtual slider to which a user input may be applied among the components of the user interface.

Also, the term "device function" refers to a function executable on a device. Different device functions may be provided depending on device types. For example, a TV device may perform functions such as power control, brightness control, contrast control, saturation control, channel control, volume control, and communication control, and a washer may perform functions such as power control and washing administration control. Since the executable functions differ per device, different device functions may be defined per device or may be at least partially common.

FIG. 3 is a flowchart illustrating a control method according to an embodiment of the disclosure.

According to an embodiment, the processor 102 may display a plurality of first UI elements on the display (operation 301).

The processor 102 may generate a user interface screen which includes a plurality of first UI elements. The processor 102 may display the generated user interface screen on the display. According to an embodiment, the first UI element may include a virtual button(s) or a virtual slider(s).

According to an embodiment, the processor 102 may receive a trigger input to the first UI element (operation 302).

According to an embodiment, the display may include a touch screen. The user input method for the touch screen may include at least one of tap, double tap, press, deep press, pan, swipe, flick, drag, pinch in/out, or rotate.

According to an embodiment, the trigger input may include a press or a haptic touch on the touch screen or a manipulation of a physical button provided on one side of the mobile device 11. The processor 102 may perform operation 303 below based on the reception of the trigger input to the first UI element and may not perform operation 303 when a user input, other than the trigger input, is received associated with the first UI element.

According to an embodiment, when a user input (e.g., tap and drag) other than the trigger input is inputted, the processor 102 may perform a function associated with the first UI element. For example, when the first UI element is associated with the power on/off function, the processor 102 may turn off the power of the mobile device 11 or may invoke a window for turning off the power. For example, when the first UI element is associated with the brightness adjustment function, the processor 102 may perform an operation of increasing or monitoring brightness according to the length of the user input (e.g., swipe).

In the following description, the execution mode when the trigger input is received may be referred to as a control mode, and the execution mode when the trigger input is not received may be referred to as a normal mode.

According to an embodiment, the processor 102 may identify a device function associated with the first UI element (operation 303).

According to an embodiment, the first UI element may be associated with a device function. As described below, it may be understood that the device function corresponds to the function code constituting the mapping table, and the first UI element may be associated with the function code.

According to an embodiment, a mapping table may be stored in the memory 101 of the mobile device 11. The mapping table may comprise a plurality of identification codes. The identification code may include (i) a device code, (ii) a mapping code, and/or (iii) a function code.

The device code may include a code for identifying the type of the device such as TV device, air conditioner device, and speaker device. Also, the device code may further include an additional code for identifying the same type of device.

The mapping code may include a code for identifying the component type of the first UI element or each of individual first UI elements. Although not limited thereto, the component types may include an on/off button type, a mode execution button type, a left/right slider type, an up-down button type, an input button type, an authentication button type, and a connection button type. For example, different codes may be provided based on component types, such as "0" for the on/off button type, "1" for the mode execution button type, and "2" for the left and right slider type. Also, for example, a unique mapping code may be provided for each first UI element included in the user interface screen 400, such as "0" for UI element A (e.g., power on/off button), "1" for UI element B (e.g., mute mode execution button), and "2" for UI element C (e.g., volume control slider).

The function code may include a code for identifying the device function. Although not limited thereto, the device function may include power on/off, mode execution (e.g., mute mode, accessibility mode, sleep mode, and dark mode), brightness adjustment, volume adjustment, content navigation, channel change, up-down selection, temperature adjustment, fan rotation intensity adjustment, search execution (e.g., setting search, content search, and channel search), authentication execution (e.g., password authentication, pattern authentication, and biometric authentication), and communication connection (e.g., Wi-Fi connection, Bluetooth connection, and cellular network connection).

For a more detailed example, the function code may be configured as "TV_00" and "TV_11." In the case of "TV_00," the processor 102 may identify the device type as TV from the device code "TV," identify the component type as on/off button from the first "0," and identify the device function as power on/off from the second "0." Also, in the case of "TV_11," the processor 102 may identify the device type as TV from the device code "TV," identify the component type as mode execution button from the first "1," and identify the device function as mute mode execution from the second "1."

According to an embodiment, a plurality of identification codes may be associated with one device function. For example, since the "power on/off" function is executable in various devices, two or more device codes may be combined with one function code to generate two or more identification codes. Further, in some cases, two or more mapping codes may be combined with one function code, thereby generating two or more identification codes.

According to an embodiment, the processor 102 may identify the neighboring device 12 capable of executing the second device function associated with the first device function (operation 304).

According to an embodiment, the first device function refers to a device function executable by the first device (e.g., the mobile device 11), and the second device function refers to a device function executable by the second device (e.g., the neighboring device 12). The first device function may be substantially the same as the second device function. For example, the function code indicating the first device function may be substantially the same as the function code indicating the second device function.

When a user input to the first UI element is received, the processor 102 may obtain one or more identification codes associated with the first UI element. The identification codes associated with the first UI element may include substantially the same mapping code. Also, the identification codes associated with the first UI element may include substantially the same function code.

The processor 102 may identify the neighboring device 12 capable of executing the device function corresponding to the function code, based on the device code included in the obtained identification codes.

According to an embodiment, the processor 102 may display a second UI element representing the neighboring device 12 on the display (operation 305).

The processor 102 may generate the second UI element based on the device code. For example, when the device code is "TV," an icon indicating the TV device may be generated as the second UI element, and when the device code is "AC," an icon indicating the air conditioning device may be generated as the second UI element. The processor 102 may display a window which includes the second UI element on the display. The window which includes the second UI element may be displayed while overlapping at least a partial area on the user interface which includes the first UI element.

According to an embodiment, the processor 102 may receive a user input associated with the second UI element (operation 306).

According to an embodiment, as described above with reference to operation 302, the display may include a touch screen. The user input method for the touch screen may include at least one of tap, double tap, press, deep press, pan, swipe, flick, drag, pinch in/out, and rotate.

The processor 102 may determine the neighboring device 12, corresponding to the second UI element, as the controlled device based on a user input (e.g., a tap, a press, and the like) associated with the second UI element.

According to an embodiment, the processor 102 may transmit a control command for executing the second device function to the neighboring device 12 (a controlled device) corresponding to the second UI element based on the received user input (operation 307).

The processor 102 may transmit a control command to the controlled device through the transceiver 103. The controlled device may execute the second device function based on receiving the control command. For example, when the second device function is "power on/off," the controlled device may turn on or off its own power based on the received control command. Meanwhile, when there are two or more controlled devices, the processor 102 may transmit control commands to the plurality of controlled devices.

Figure 4:
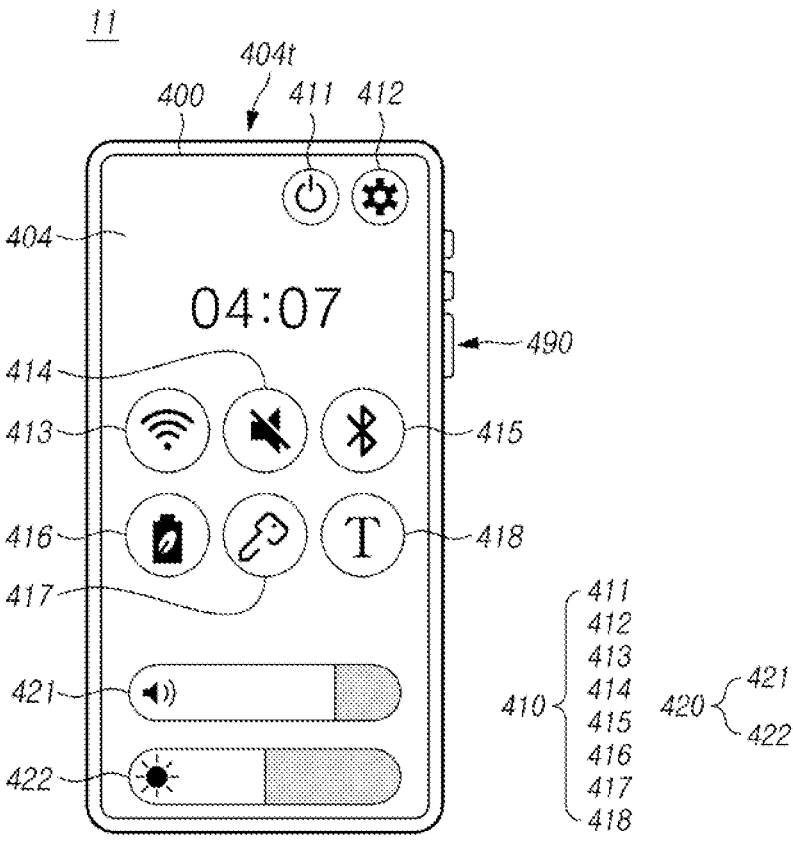
FIG. 4 illustrates a mobile device and a user interface screen of the mobile device according to an embodiment of the disclosure.

FIG. 4 illustrates a mobile device and a user interface screen of the mobile device according to an embodiment of the disclosure.

According to an embodiment, the mobile device 11 may include a display 404. The display 404 may include a touchscreen as at least a portion thereof. The display 404 may show a user interface screen 400, which is described below, on the display 404. The mobile device 11 may interact with the user based on a user input (e.g., a touch input) to one or more UI elements (e.g., first UI elements (410 and 420) and second UI elements (441*a*, . . . , 441*e*)) on the user interface screen 400.

According to an embodiment, the mobile device 11 may further include a physical key button 490. The physical key button 490 may be provided on one side of the mobile device 11. The physical key button 490 may be used as a means for receiving a trigger input. For example, based on the application of the input to the physical key button 490, the mobile device 11 may determine that the trigger input described above is received in operation 302 of FIG. 3.

The trigger input may be made not only by a user input to the physical key button 490, but also by a user input to the first UI element (410 or 420). For example, the trigger input may be detected based on the user's touch input to the first UI element (410 or 420) being applied for a predefined time period.

Further, the trigger input may be detected based on a user input to a trigger button (not shown) provided in advance on the user interface screen 400. For example, the user interface screen 400 may include a trigger button (not shown). Based on application of the user input to the trigger button, the mobile device 11 may operate in the trigger mode. A physical manipulation of a physical key button or a predefined manipulation method such as a long press is a hidden function of the mobile device 11 and is difficult for the user to intuitively recognize. However, if a separate trigger button is provided, the user may easily enter the trigger mode and intuitively recognize the presence or absence of the corresponding function.

Although not limited thereto, the mobile device 11 may transmit to the neighboring device 12, a command for operating the neighboring devices 12 in the standby mode based on entering the trigger mode. The neighboring device 12 may wait for reception of a control command to be described below based on reception of the command.

The following description will be made with reference to the user interface screen 400 illustrated in FIG. 4, but the user interface screen 400 applied to various embodiments of the disclosure is not limited to the illustrated example. The mobile device 11 may be implemented as various types of wireless devices (e.g., smart watches and smart glasses) as well as smartphones, and in this case, the user interface screen 400 may be changed according to the type of each wireless device. However, even if the user interface screen 400 is changed, the first UI elements (410 and 420) and the second UI elements (441*a*, . . . , 441*e*) and various windows to be described below may be included as at least part of the user interface screen 400, and equivalent operation(s) may be performed by the mobile device 11.

According to an embodiment, the user interface screen 400 may include the first UI elements (410 and 420). Referring to FIG. 4, the first UI elements (410 and 420) may include a power on/off button 411, a setting button 412, a Wi-Fi connection button 413, a mute mode execution button 414, a Bluetooth connection button 415, a power saving mode execution button 416, an authentication button 417, and a key-call button 418. Also, as illustrated in FIG. 4, the first UI elements (410 and 420) may include a volume control slider 421 and a brightness control slider 422. Each of the first UI elements (410 and 420) may be divided based on an interaction method and/or a component type.

According to an embodiment, the first UI elements (410 and 420) may be divided into a virtual button 410 and a slider 420 based on the interaction method. Referring to FIG. 4, the first UI element 410 corresponding to the virtual button 410 may include a power on/off button 411, a setting button 412, a Wi-Fi connection button 413, a mute mode execution button 414, a Bluetooth connection button 415, a power saving mode execution button 416, an authentication button 417, and a key-call button 418. Referring to FIG. 4, the first UI element 420 corresponding to the slider 420 may include a volume control slider 421 and a brightness control slider 422.

According to an embodiment, the first UI elements (410 and 420) may be classified based on component types. The component types may include, e.g., an on/off button type, a mode execution button type, a left/right slider type, an up-down button type, an input button type, an authentication button type, and a connection button type, but are not limited thereto. Referring to FIG. 4, the power on/off button 411 may correspond to the on/off button type. The mute mode execution button 414 and the power saving mode execution button 416 may correspond to the mode execution button type. The volume control slider 421 and the brightness control slider 422 may correspond to the left/right slider type. The Wi-Fi connection button 413 and the Bluetooth connection button 415 may correspond to the connection button type. The authentication button 417 may correspond to the authentication button type.

According to an embodiment, the user interface screen 400 illustrated in FIG. 4 may be referred to as a quick pad or a control pad. The quick pad may be invoked by a drag input to the touch screen. For example, in response to a drag input from an upper side 404*t* to a lower side of the touch screen, the mobile device 11 may display the quick pad on the touch screen. The user interface screen 400 illustrated in FIG. 4 may be represented in the form of a widget, and the widget may be positioned on at least a portion of the screen of the display 404. The user interface screen 400 illustrated in FIG. 4 may be represented as at least a portion of the execution screen of a home IoT application.

As such, the user interface display of the disclosure may be provided in various manners, and the arrangement or positions of the UI elements constituting the user interface screen may be aesthetically/functionally changed or rearranged. Also, referring to the following drawings, the user interface screen of the disclosure is illustrated and described as being displayed on the display of a bar-type wireless terminal, but the user interface screen of the disclosure is not limited as displayed by the bar-type wireless terminal. According to an embodiment, the mobile device 11 may be a watch-type wireless terminal or a glasses-type wireless terminal, and each wireless terminal may have its own display. In this case, each type of wireless terminal may show a user interface screen of the disclosure, redesigned adaptively to each display dimension and display shape. The user interface screen displayed by each wireless terminal is as described below.

Figure 5A:
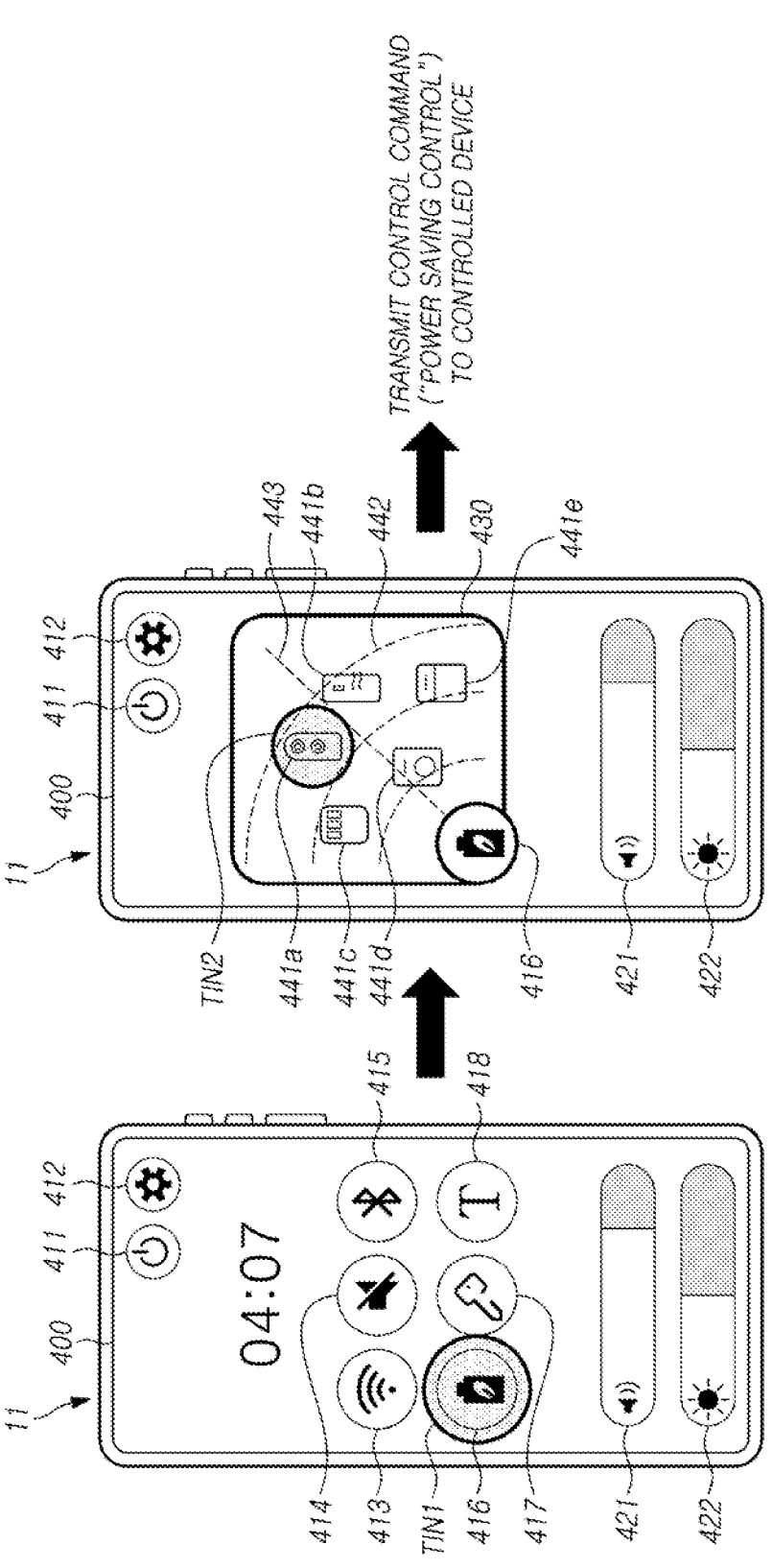
FIG. 5A illustrates an example method for controlling a neighboring device according to an embodiment of the disclosure.
Figure 5B:
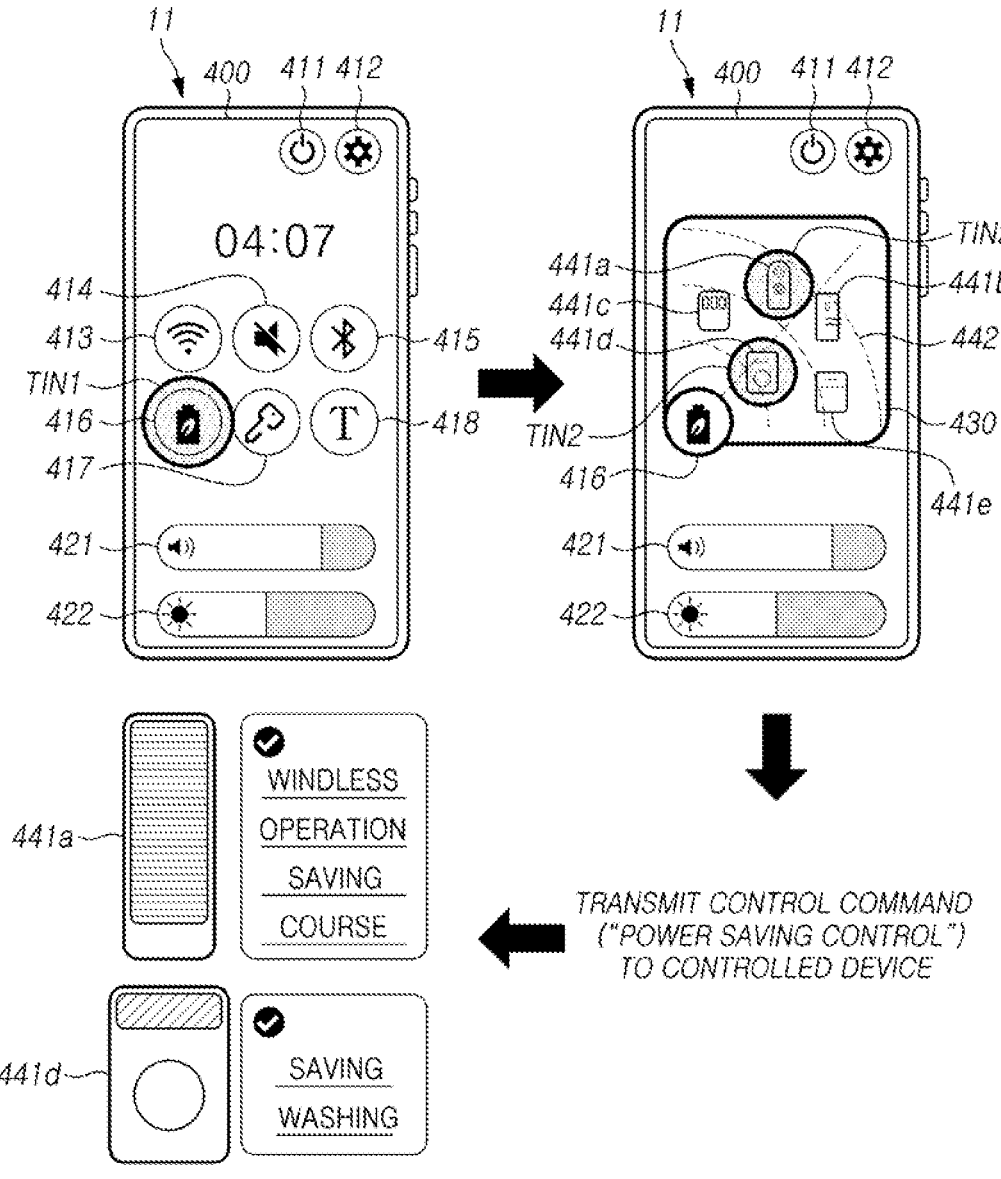
FIG. 5B illustrates an example method for controlling a plurality of neighboring devices according to an embodiment of the disclosure.

FIG. 5A illustrates an example method for controlling a neighboring device 12 according to an embodiment of the disclosure. FIG. 5B illustrates an example method for controlling a plurality of neighboring devices 12 according to an embodiment of the disclosure.

Referring to FIG. 5A, the user interface screen 400 may include a plurality of first UI elements (410 and 420). The processor 102 may identify a user input TIN1 to any one of the plurality of first UI elements (410 and 420).

According to an embodiment, the processor 102 may determine a user input TIN1 to any one of the first UI elements (410 and 420) as any one of a trigger input or a normal input. If it is determined as the trigger input, the processor 102 may operate in the control mode. If it is determined as the normal input, the processor 102 may operate in the normal mode.

According to an embodiment, when operating in the normal mode, the processor 102 may control the mobile device 11 to perform the function corresponding to the first UI element (410 or 420) based on reception of the user input TIN1 associated with the first UI element (410 or 420). For example, the processor 102 may execute the power saving mode based on receiving the user input TIN1 to the power saving mode execution button.

According to an embodiment, when operating in the control mode, the processor 102 may obtain a function code corresponding to the first UI element (410 or 420), based on reception of a trigger input to the first UI element (410 or 420). Further, the processor 102 may obtain a plurality of identification codes having substantially the same function code as the obtained function code. The processor 102 may determine at least some of the plurality of devices corresponding to the device code included in the obtained identification codes as the neighboring device 12.

According to an embodiment, the controlled device may be determined from among neighboring devices 12. The processor 102 may detect one or more neighboring devices 12 using the transceiver 103. For example, the processor 102 may determine one or more neighboring devices 12 capable of communicating with the mobile device 11 through a method such as ultra-wideband (UWB) or Wi-Fi direct. Also, the processor 102 may obtain location information about the neighboring device 12 using a communication method such as UWB or Wi-Fi Direct. Thereafter, the processor 102 may determine at least some of the neighboring devices 12 as controlled devices, based on a user input TIN2 (e.g., a selection input) to one or more of the neighboring devices 12.

According to an embodiment, the processor 102 may generate the second UI elements (441a, . . . , 441e) indicating the neighboring device(s) 12. Further, the processor 102 may display a map-type window 430 which includes the second UI element(s) (441a, . . . , 441e). The map-type window 430 may include at least one of one or more second UI element(s) (441a, . . . , 441e), a plurality of iso-level lines 442 indicating the distance between the mobile device 11 and the neighboring device 12, and a directivity line 443 indicating the directivity of the mobile device 11. The positions of the second UI element(s) (441a, . . . , 441e) displayed on the map-type window 430 may be determined based on the above-described position information. Furthermore, the mobile device 11 may include a directivity sensor such as an IMU sensor, and directivity information obtained by the directivity sensor may be based on determination of the directivity line 443.

According to an embodiment, the map-type window 430 may at least partially overlap the first UI element (410 or 420) selected by the user input TIN1. Also, the selected first UI element (410 or 420) may be the center of the iso-level line(s) 442. According to an embodiment, the position of display of the selected first UI element (410 or 420) may be changed to the center of the map-type window 430. When the position of the selected first UI element (410 or 420) is changed, the positions of display of the iso-level line 442, the directivity line 443, and the second UI element(s) (441a, . . . , 441e) may also be changed.

According to an embodiment, the second UI element(s) (441a, . . . , 441e) on the map-type window 430 may be positioned closer to the center of the iso-level line 442 as it is closer to the mobile device 11 and may be positioned farther from the center of the iso-level line 442 as it is farther away from the mobile device 11. Also, the second UI element(s) (441a, . . . , 441e) may be positioned on the left and/or right side of the directivity line 443 based on sensing information (directivity information) above the directivity sensor.

According to an embodiment, the processor 102 may detect a user input TIN2 to at least one of the second UI element(s) (441a, . . . , 441e) on the map-type window 430. The processor 102 may transmit a control command to the controlled device corresponding to the second UI element associated with the user input TIN2. The control command may be associated with a function code corresponding to the previously selected first UI element (410 or 420). In other words, the processor 102 may wirelessly control the controlled device to perform the device function corresponding to the first UI element (410 or 420).

Referring to FIG. 5B, in substantially the same manner as that shown in FIG. 5A, the processor 102 may display a map-type window 430 on the display 404.

According to an embodiment, the processor 102 may transmit a control command to the neighboring device 12 (controlled device) corresponding to the second UI elements (441a, . . . , 441e) based on a user input TIN2 of the second UI elements (441a, . . . , 441e). The control command may correspond to a function code related to the previously selected first UI element (410 or 420).

According to an embodiment, the processor 102 may not transmit a control command based on receiving the user input TIN2 to the second UI elements (441a, . . . , 441e). According to an embodiment, when receiving the user input TIN2 to the second UI elements (441a, . . . , 441e), the processor 102 may determine that the controlled device corresponding to the second UI elements (441a, . . . , 441e) where the user input TIN2 has been received is a transmission target for the control command. Two or more transmission targets may be selected.

According to an embodiment, when two or more controlled devices are determined as transmission targets, the processor 102 may transmit control commands to the plurality of transmission targets. Although not limited thereto, transmission of the control command to the plurality of transmission targets may be performed based on receiving a predefined transmission trigger input. The predefined transmission trigger input may be at least one of a user input to the remaining area other than the map-type window 430 or a user input TIN1 to the first UI element (410 or 420) displayed together with the map-type window 430.

According to an embodiment, the plurality of transmission targets may execute a device function associated with the control command based on reception of the control command. For example, when a control command for "power saving control (power saving mode execution)" is received, each transmission target may execute the power saving mode. Meanwhile, the implementation method of the power saving mode may be different for each electronic device, and each electronic device may execute a unique power saving mode predefined for each device. Accordingly, even when the same control command is received, the device function that is actually implemented may differ depending on the type of transmission target. For example, an air conditioner device may execute a windless operation or a saving course after receiving a control command for power saving control, and a washer device may execute an eco-washing cycle after receiving a control command for power saving control.

The method for controlling the plurality of neighboring devices 12 described above with reference to FIG. 5B may be implemented substantially the same to the embodiment(s) to be described below.

Figure 6:
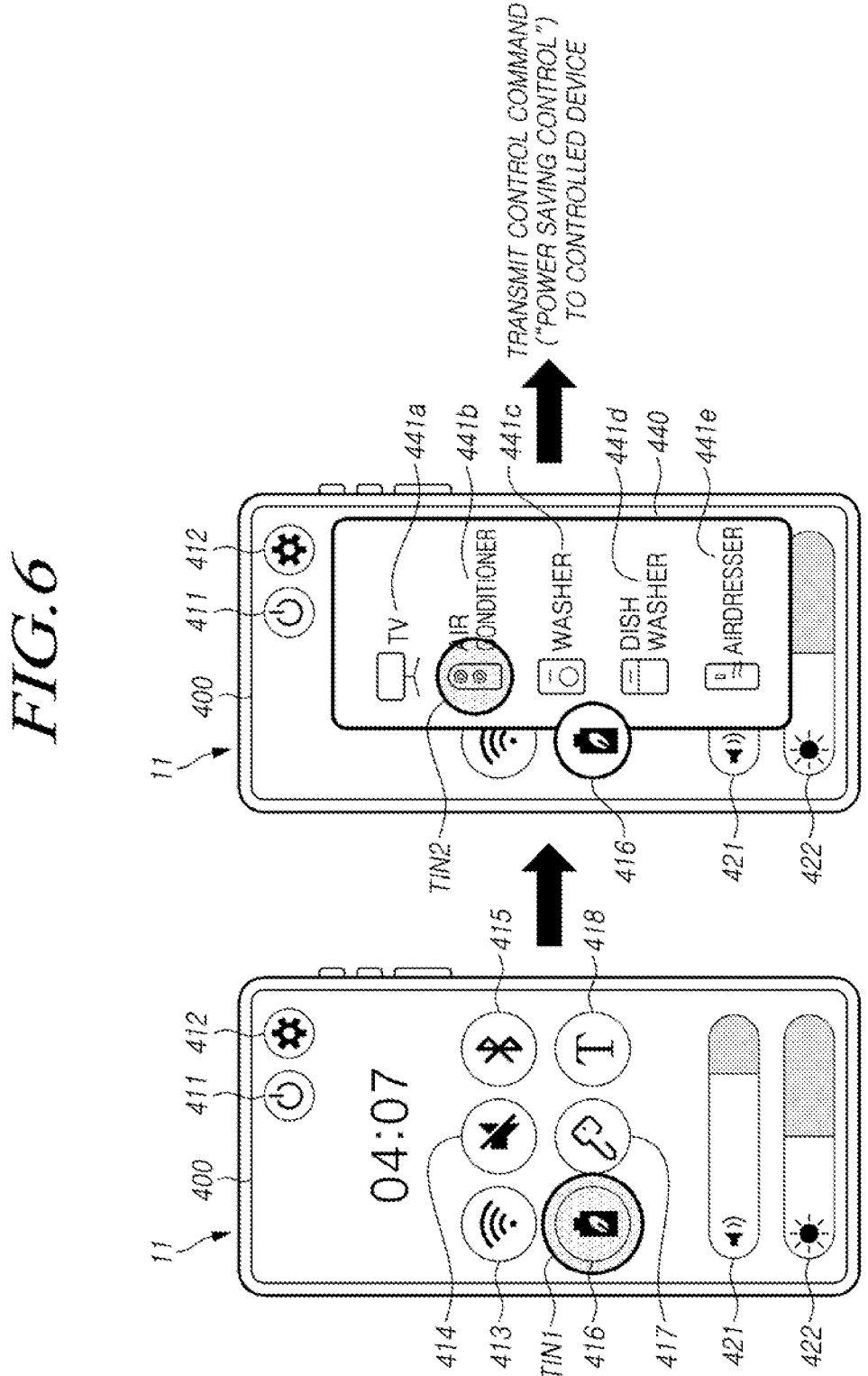
FIG. 6 illustrates an example method for controlling a neighboring device according to an embodiment of the disclosure.

FIG. 6 illustrates an example method for controlling a neighboring device 12 according to an embodiment of the disclosure.

Referring to FIG. 6, according to an embodiment, the user interface screen 400 may be configured substantially the same as that described with reference to FIG. 4. Hereinafter, the processor 102 relates to the processor 102 provided in the mobile device 11 (e.g., a user device).

Referring to FIG. 4, the user interface screen 400 may include a plurality of first UI elements (410 and 420). The processor 102 may identify a user input TIN1 to any one of the plurality of first UI elements (410 and 420).

According to an embodiment, the processor 102 may determine a user input TIN1 to any one of the first UI elements (410 and 420) as any one of a trigger input or a normal input. If it is determined as the trigger input, the processor 102 may operate in the control mode. If it is determined as the normal input, the processor 102 may operate in the normal mode.

According to an embodiment, when operating in the normal mode, the processor 102 may control the mobile device 11 to perform the function corresponding to the first UI element (410 or 420) based on the user input TIN1 associated with the first UI element (410 or 420). For example, the processor 102 may execute the power saving mode based on the user input TIN1 associated with the power saving mode execution button.

According to an embodiment, when operating in the control mode, the processor 102 may obtain a function code corresponding to the first UI element (410 or 420), based on a trigger input of the first UI element (410 or 420). Further, the processor 102 may obtain a plurality of identification codes having substantially the same function code as the obtained function code. The processor 102 may determine at least some of the plurality of devices corresponding to the device code included in the obtained identification codes as the neighboring device 12.

According to an embodiment, the controlled device may be determined among neighboring devices 12. The processor 102 may detect one or more neighboring devices 12 using the transceiver 103. For example, the processor 102 may determine one or more neighboring devices 12, capable of communicating with the mobile device 11, through a communication method such as UWB or Wi-Fi direct. Also, the processor 102 may obtain location information about the neighboring device 12 using a communication method such as UWB or Wi-Fi Direct. Thereafter, the processor 102 may determine at least some of the neighboring devices 12 as controlled devices, based on a user input (e.g., a selection input) to one or more of the neighboring devices 12.

According to an embodiment, the processor 102 may generate the second UI elements (441a, ..., 441e) indicating the neighboring device(s) 12. Further, the processor 102 may display a list-type window 440 which includes the second UI elements (441a, ..., 441e). The list-type window 440 may display one or more second UI elements (441a, ..., 441e) in a list type. FIG. 6 illustrates that the plurality of second UI elements (441a, ..., 441e) are arranged vertically, but without limitations thereto, the second UI elements (441a, ..., 441e) may be arranged in the type of one or more matrixes.

According to an embodiment, the plurality of second UI elements (441a, ..., 441e) constituting the list-type window 440 may be arranged based on priority. For example, the second UI element having a higher priority may be positioned higher than the second UI element having a lower priority.

According to an embodiment, the priority may be determined based on at least one of the distance between the mobile device 11 and the neighboring device 12 and/or the position of the neighboring device 12. For example, a higher priority may be given as it is positioned closer to the mobile device 11. For example, based on the directivity information about the mobile device 11, a higher priority may be given as it is positioned further adjacent to the directivity direction of the mobile device 11. The mobile device 11 may include a directivity sensor such as an IMU sensor, and the directivity information obtained by the directivity sensor may include an oriented direction of the mobile device 11. According to an embodiment, the directivity information to be obtained by the IMU sensor may change as the mobile device 11 moves, and the arrangement of the second UI elements (441a, ..., 441e) included in the list-type window 440 may be changed in response to the change in the directivity information.

According to an embodiment, the list-type window 440 may at least partially overlap the first UI element (410 or 420) selected by the user input TIN1. According to an embodiment, the first UI element (410 or 420) may remain in the position where it was before the trigger input is received. For example, when the trigger input is received, the list-type window 440 may be displayed at least partially overlapping the first UI element (410 or 420), and the first UI element (410 or 420) may remain in its original position.

According to an embodiment, the processor 102 may detect a user input TIN2 to at least one of the second UI element(s) (441a, ..., 441e) on the list-type window 440. The processor 102 may transmit a control command to the controlled device corresponding to the second UI element ... associated with the user input TIN2. The control command may be associated with a function code corresponding to the previously selected first UI element (410 or 420). In other words, the processor 102 may wirelessly control the controlled device to perform the device function corresponding to the first UI element (410 or 420).

Figure 7:
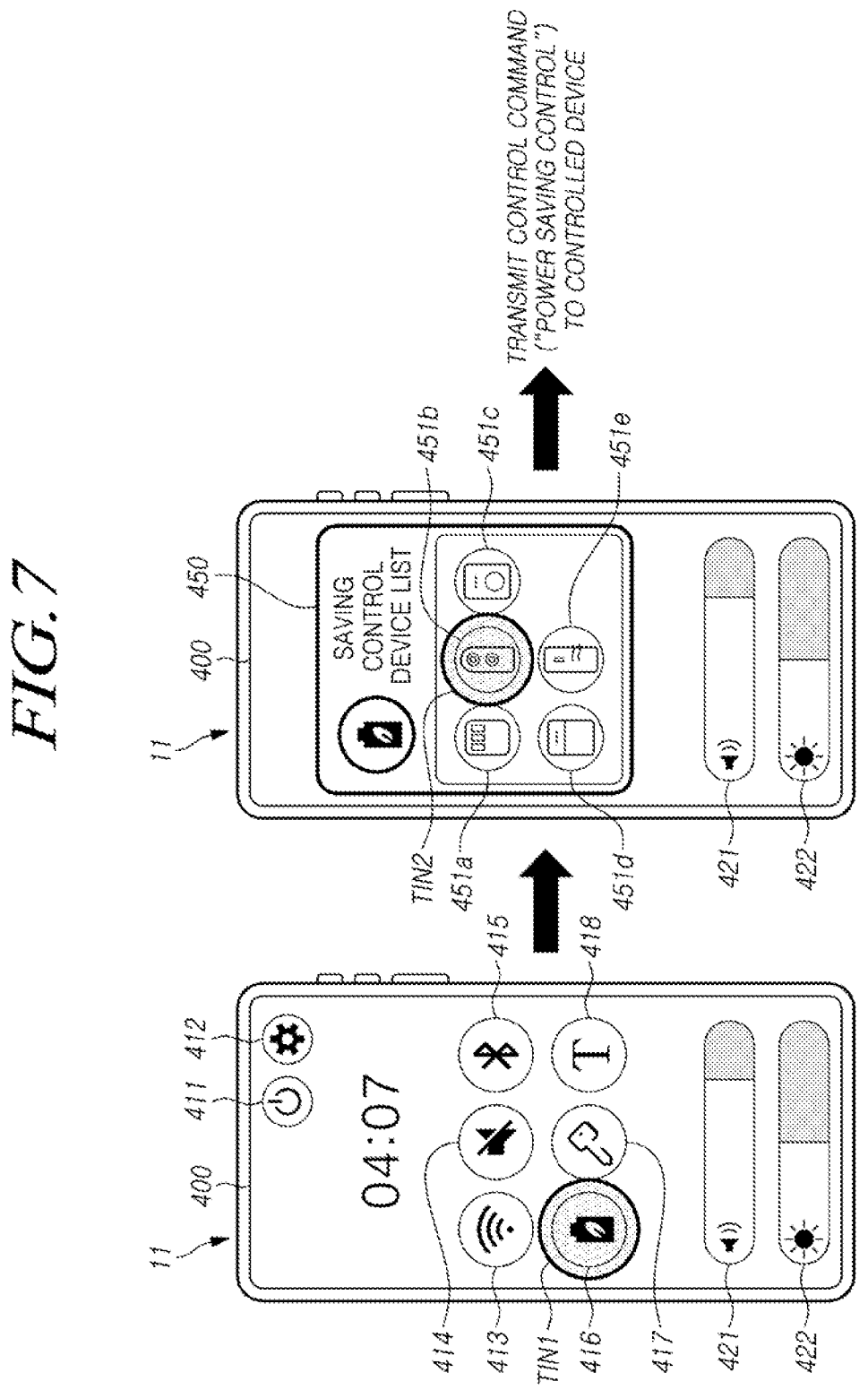
FIG. 7 illustrates an example method for controlling a neighboring device according to an embodiment of the disclosure.

FIG. 7 illustrates an example method for controlling a neighboring device 12 according to an embodiment of the disclosure.

Referring to FIG. 7, according to an embodiment, the user interface screen 400 may be configured substantially the same as that described with reference to FIG. 4. Hereinafter, the processor 102 relates to the processor 102 provided in the mobile device 11 (e.g., a user device).

Referring to FIG. 4, the user interface screen 400 may include a plurality of first UI elements (410 and 420). The processor 102 may identify a user input TIN1 to any one of the plurality of first UI elements (410 and 420).

According to an embodiment, the processor 102 may determine a user input TIN1 to any one of the first UI elements (410 and 420) as any one of a trigger input or a normal input. If it is determined as the trigger input, the processor 102 may operate in the control mode. If it is determined as the normal input, the processor 102 may operate in the normal mode.

According to an embodiment, when operating in the normal mode, the processor 102 may control the mobile device 11 to perform the function corresponding to the first UI element (410 or 420) based on reception of the user input TIN1 to the first UI element (410 or 420). For example, the processor 102 may execute the power saving mode based on the user input TIN1 associated with the power saving mode execution button.

According to an embodiment, when operating in the control mode, the processor 102 may obtain a function code corresponding to the first UI element (410 or 420), based on a trigger input to the first UI element (410 or 420). Further, the processor 102 may obtain a plurality of identification codes having substantially the same function code as the obtained function code. The processor 102 may determine at least some of the plurality of devices corresponding to the device code included in the obtained identification codes as the neighboring device 12.

According to an embodiment, the controlled device may be determined from among neighboring devices 12. The processor 102 may detect one or more neighboring devices 12 using the transceiver 103. For example, the processor 102 may determine one or more neighboring devices 12 capable of communicating with the mobile device 11 through a communication method such as UWB or Wi-Fi direct. Also, the processor 102 may obtain location information about the neighboring device 12 using a communication method such as UWB or Wi-Fi Direct. Thereafter, the processor 102 may determine at least some of the neighboring devices 12 as controlled devices, based on a user input (e.g., a selection input) to one or more of the neighboring devices 12.

According to an embodiment, the processor 102 may generate the second UI elements (451a, . . . , 451e) indicating the neighboring device(s) 12. Further, the processor 102 may display a modal-type window 450 which includes the second UI element(s) (451a, . . . , 451e). The modal-type window 450 may display one or more second UI elements (451a, . . . , 451e) in a list type.

According to an embodiment, the plurality of second UI elements (451a, . . . , 451e) constituting the modal-type window 450 may be arranged based on priority. For example, the second UI element having a higher priority may be positioned further left than the second UI element having a lower priority. For example, the second UI element having a higher priority may be positioned higher than the second UI element having a lower priority. For example, the second UI element having a higher priority may be positioned higher and further left than the second UI element having a lower priority.

According to an embodiment, the priority may be determined based on at least one of the distances between the mobile device 11 and the neighboring device 12 and/or the position of the neighboring device 12. For example, a higher priority may be given as it is positioned closer to the mobile device 11. For example, based on the directivity information about the mobile device 11, a higher priority may be given as it is positioned further adjacent to the directivity direction of the mobile device 11. The mobile device 11 may include a directivity sensor such as an IMU sensor, and the directivity information obtained by the directivity sensor may include an oriented direction of the mobile device 11. According to an embodiment, the directivity information to be obtained by the IMU sensor may change as the mobile device 11 moves, and the arrangement of the second UI elements (451a, . . . , 451e) included in the modal-type window 450 may be changed in response to the change in the directivity information.

According to an embodiment, the modal-type window 450 may include the first UI element (410 or 420) selected by the user input TIN1. Also, the modal-type window 450 may include a description of a device function corresponding to the first UI element (410 or 420). The device function corresponding to the first UI element (410 or 420) may be identified based on the function code.

According to an embodiment, the modal-type window 450 may be displayed while at least partially overlapping the plurality of first UI element (410 or 420). Further, the modal-type window 450 may be displayed while overlapping all of the plurality of first UI elements (410 and 420).

According to an embodiment, the processor 102 may detect a user input TIN2 associated with at least one of the second UI element(s) (451a, . . . , 451e) on the modal-type window 450. The processor 102 may transmit a control command to the controlled device corresponding to the second UI element . . . associated with the user input TIN2. The control command may be associated with a function code corresponding to the previously selected first UI element (410 or 420). In other words, the processor 102 may wirelessly control the controlled device to perform the device function corresponding to the first UI element (410 or 420).

Figure 8:
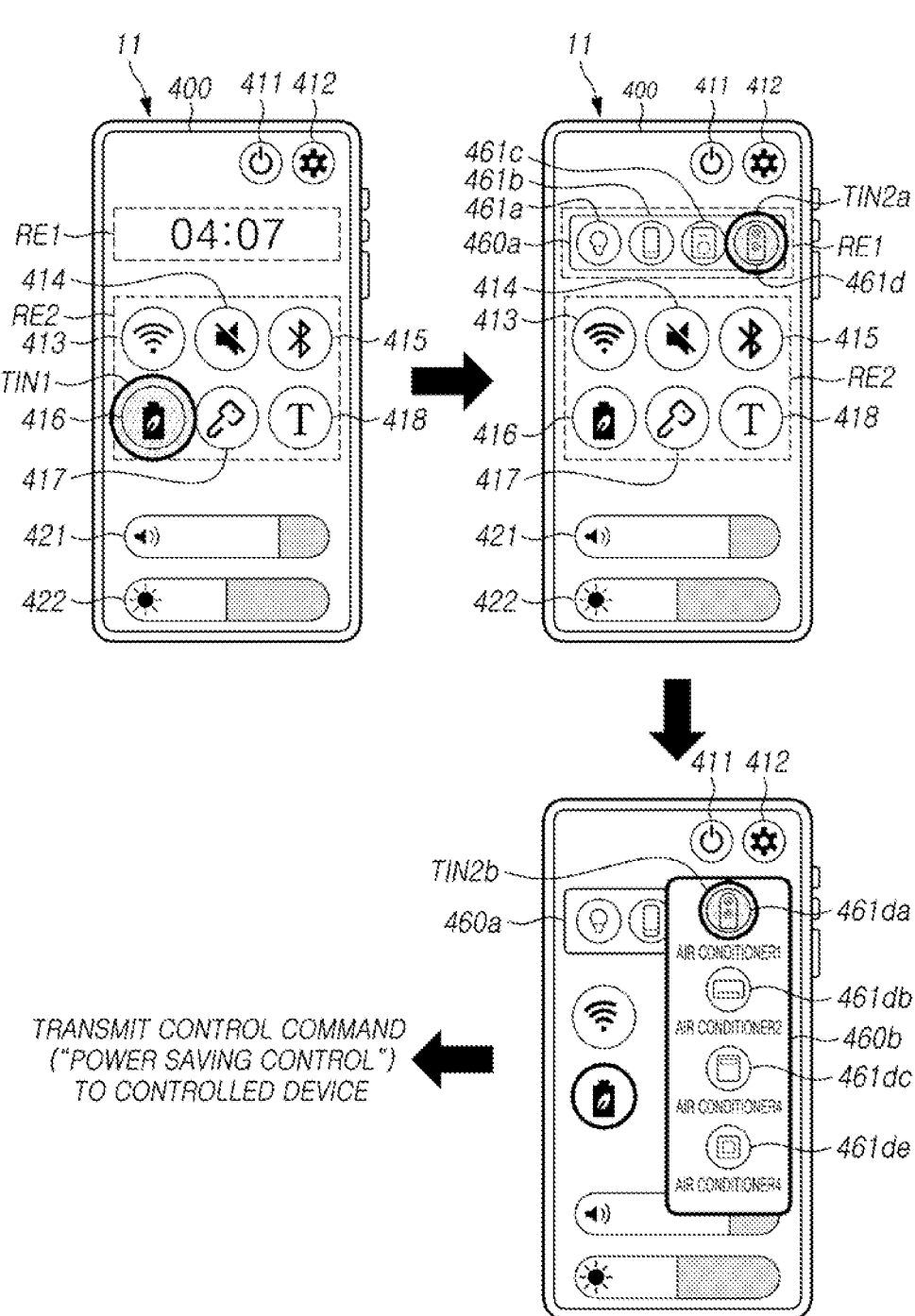
FIG. 8 illustrates an example method for controlling a neighboring device according to an embodiment of the disclosure.

FIG. 8 illustrates an example method for controlling a neighboring device 12 according to an embodiment of the disclosure.

Referring to FIG. 8, according to an embodiment, the user interface screen 400 may be configured substantially same as that described with reference to FIG. 4. Hereinafter, the processor 102 relates to the processor 102 provided in the mobile device 11 (e.g., a user device).

Referring to FIG. 4, the user interface screen 400 may include a plurality of first UI elements (410 and 420). The processor 102 may identify a user input TIN1 to any one of the plurality of first UI elements (410 and 420).

According to an embodiment, the processor 102 may determine a user input TIN1 to any one of the first UI elements (410 and 420) as any one of a trigger input or a normal input. If it is determined as the trigger input, the processor 102 may operate in the control mode. If it is determined as the normal input, the processor 102 may operate in the normal mode.

According to an embodiment, when operating in the normal mode, the processor 102 may control the mobile device 11 to perform the function corresponding to the first UI element (410 or 420) based on the user input TIN1 associated with the first UI element (410 or 420). For example, the processor 102 may execute the power saving mode based on the user input TIN1 associated with the power saving mode execution button.

According to an embodiment, when operating in the control mode, the processor 102 may obtain a function code corresponding to the first UI element (410 or 420), based on a trigger input to the first UI element (410 or 420). Further, the processor 102 may obtain a plurality of identification codes having substantially the same function code as the obtained function code. The processor 102 may determine at least some of the plurality of devices corresponding to the device code included in the obtained identification codes as the neighboring device 12.

According to an embodiment, the controlled device may be determined from among neighboring devices 12. The processor 102 may detect one or more neighboring devices 12 using the transceiver 103. For example, the processor 102 may determine one or more neighboring devices 12 capable of communicating with the mobile device 11 through a communication method such as UWB or Wi-Fi direct. Also, the processor 102 may obtain location information about the neighboring device 12 using a communication method such as UWB or Wi-Fi Direct. Thereafter, the processor 102 may determine at least some of the neighboring devices 12 as controlled devices, based on a user input (e.g., a selection input) to one or more of the neighboring devices 12.

According to an embodiment, the processor 102 may generate the second UI elements (441a, . . . , 441e) indicating the neighboring device(s) 12. Further, the processor 102 may display a bar-type window 460a which includes the second UI elements (441a, . . . , 441e). The bar-type window 460a may display one or more second UI elements (441a, . . . , 441e) in a list type. The bar-type window 460a may be displayed in a first area RE1 of the user interface screen 400.

According to an embodiment, the user interface screen 400 may include the first area RE1 and a second area RE2. Default information (e.g., time information and weather information) of a previously defined type may be displayed in the first area RE1. One or more first UI elements 410 and 420 may be displayed in the second area RE2.

According to an embodiment, the processor 102 may change the display of the first area RE1 based on detecting a trigger input. For example, the processor 102 may change the first area RE1 from a predefined type of default information into the bar-type window 460a and display it based on detecting the trigger input. Even if the trigger input is received, the display of the first UI element 410 or 420 being displayed in the second area RE2 may not be changed.

According to an embodiment, the plurality of second UI elements (441a, . . . , 441e) constituting the bar-type window 460a may be arranged based on priority. For example, the second UI element having a higher priority may be positioned further left than the second UI element having a lower priority.

According to an embodiment, the priority may be determined based on at least one of the distances between the mobile device 11 and the neighboring device 12 and/or the position of the neighboring device 12. For example, a higher priority may be given as it is positioned closer to the mobile device 11. For example, based on the directivity information about the mobile device 11, a higher priority may be given as it is positioned further adjacent to the directivity direction of the mobile device 11. The mobile device 11 may include a directivity sensor such as an IMU sensor, and the directivity information obtained by the directivity sensor may include an oriented direction of the mobile device 11. According to an embodiment, the directivity information to be obtained by the IMU sensor may change as the mobile device 11 moves, and the arrangement of the second UI elements (441a, . . . , 441e) included in the bar-type window 460a may be changed in response to the change in the directivity information.

According to an embodiment, a badge formed of an Arabic number may be coupled to each of the second UI elements (441a, . . . , 441e) included in the bar-type window 460a. The badge may be displayed to indicate the number of controlled devices corresponding to each of the second UI elements (441a, . . . , 441e). For example, when the badge is indicated as "2," the user may recognize that there are two (2) controlled devices corresponding to the second UI elements (441a, . . . , 441e).

According to an embodiment, the processor 102 may detect a user input TIN2a to the badge-coupled second UI element (441a, . . . , or 441e).

According to an embodiment, if a first user input is applied to the badge-coupled second UI element (441a, . . . , or 441e), the processor 102 may determine that all controlled devices corresponding to the first user input-applied second UI element (441a, . . . , or 441e) may be transmission targets for the control command.

According to an embodiment, if a second user input TIN2a is applied to the badge-coupled second UI element (441a, . . . , or 441e), the processor 102 may display an additional list-type window 460b. The additional list-type window 460b may include third UI elements (461da, . . . , 461de) indicating the controlled devices corresponding to the second UI elements (441a, . . . , 441e).

According to an embodiment, the first user input may be a tap-type touch input, and the second user input TIN2a may be a press-type or swipe-type touch input. When the second user input TIN2a is of a swipe type, the swipe direction of the second user input TIN2a may be substantially the same as the length direction of the additional list-type window 460b.

According to an embodiment, the third UI elements (461da, . . . , 461de) may be arranged in substantially the same manner as the second UI elements (441a, . . . , 441e). For example, based on the priority, the third UI element(s) having a higher priority may be positioned higher than the third UI element(s) having a lower priority.

According to an embodiment, the additional list-type window 460b may be displayed while at least partially overlapping the plurality of first UI elements (410 and 420) and/or the second UI elements (441a, . . . , 441e).

According to an embodiment, the processor 102 may detect a user input TIN3 to at least one of the third UI elements (461da, . . . , 461de) on the bar-type window 460a. The processor 102 may transmit a control command to the controlled device corresponding to the third UI element associated with the user input TIN3.

According to an embodiment, the control command may be associated with a function code corresponding to the previously selected first UI element (410 or 420). In other words, the processor 102 may wirelessly control the controlled device to perform the device function corresponding to the first UI element (410 or 420).

Figure 9:
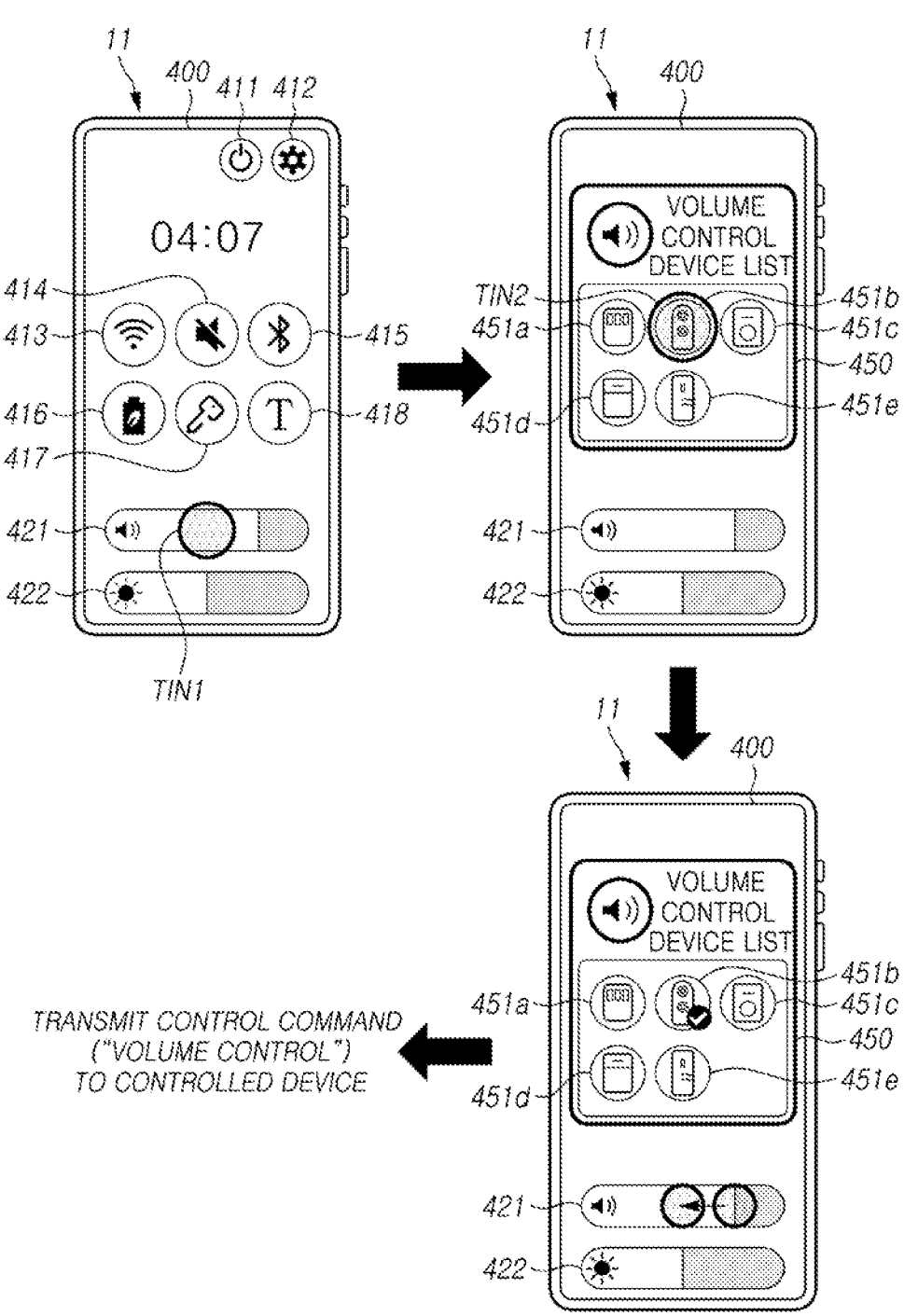
FIG. 9 illustrates an example method for controlling a neighboring device according to an embodiment of the disclosure.

FIG. 9 illustrates an example method for controlling a neighboring device 12 according to an embodiment of the disclosure.

Referring to FIG. 9, according to an embodiment, the user interface screen 400 may be configured substantially the same as that described with reference to FIG. 4. Hereinafter, the processor 102 relates to the processor 102 provided in the mobile device 11 (e.g., a user device).

Referring to FIG. 4, the user interface screen 400 may include a plurality of first UI elements (410 and 420). The processor 102 may identify a user input to any one of the plurality of first UI elements (410 and 420).

According to an embodiment, the processor 102 may determine a user input to any one of the first UI elements (410 and 420) as any one of a trigger input or a normal input. If it is determined as the trigger input, the processor 102 may operate in the control mode. If it is determined as the normal input, the processor 102 may operate in the normal mode.

According to an embodiment, when operating in the normal mode, the processor 102 may control the mobile device 11 to perform the function corresponding to the first UI element (410 or 420) based on the user input associated with the first UI element (410 or 420). For example, the processor 102 may execute the power saving mode based the user input associated with the power saving mode execution button.

According to an embodiment, when operating in the control mode, the processor 102 may obtain a function code corresponding to the first UI element (410 or 420), based on a trigger input to the first UI element (410 or 420). Further, the processor 102 may obtain a plurality of identification codes having substantially the same function code as the obtained function code. The processor 102 may determine at least some of the plurality of devices corresponding to the device code included in the obtained identification codes as the neighboring device 12.

According to an embodiment, the controlled device may be determined from among neighboring devices 12. The processor 102 may detect one or more neighboring devices 12 using the transceiver 103. For example, the processor 102 may determine one or more neighboring devices 12 capable of communicating with the mobile device 11 through a communication method such as UWB or Wi-Fi direct. Also, the processor 102 may obtain location information about the neighboring device 12 using a communication method such as UWB or Wi-Fi Direct. Thereafter, the processor 102 may determine at least some of the neighboring devices 12 as controlled devices, based on a user input (e.g., a selection input) to one or more of the neighboring devices 12.

According to an embodiment, the first UI elements (410 and 420) to which the trigger input is applied may be sliders (421 and 422). The processor 102 may increase or decrease a specific parameter based on a user input to the sliders (421 and 422), and when a trigger input to the sliders (421 and 422) is applied, the processor 102 may increase or decrease the specific parameter of the controlled device based on the user input TIN1 to the sliders (421 and 422).

According to an embodiment, the processor 102 may start the trigger mode based on detection of a trigger input (e.g., TIN1) to the first UI element (410 or 420) of the slider type (421 or 422). The processor 102 may determine that at least one of the plurality of neighboring devices 12 is a controlled device by detecting a user input to at least one of the plurality of second UI elements (441a, . . . , 441e) included in the modal-type window 450.

According to an embodiment, the processor 102 may transmit a control command to the controlled device, based on a user input TIN1 associated with the first UI element (410 or 420) of the slider type (421 or 422). When the first UI element (410 or 420) of the slider type (421 or 422) is a left and right slider (421 or 422), the size of the parameter to be changed or newly set based on a tap input or a swipe input to the left and right slider (421 or 422) may be determined, and the processor 102 may transmit the parameter of the determined size to the controlled device. The size of the parameter may be configured as at least a part of the control command.

According to an embodiment, the controlled device may identify the function code based on receiving the control command. The processor 102 may perform a device function corresponding to the first UI element (410 or 420) based on the function code and the parameter size. For example, when the function code is volume control and the parameter size is +10, the controlled device may increase the volume by a size corresponding to the parameter size of +10.

Figure 10A:
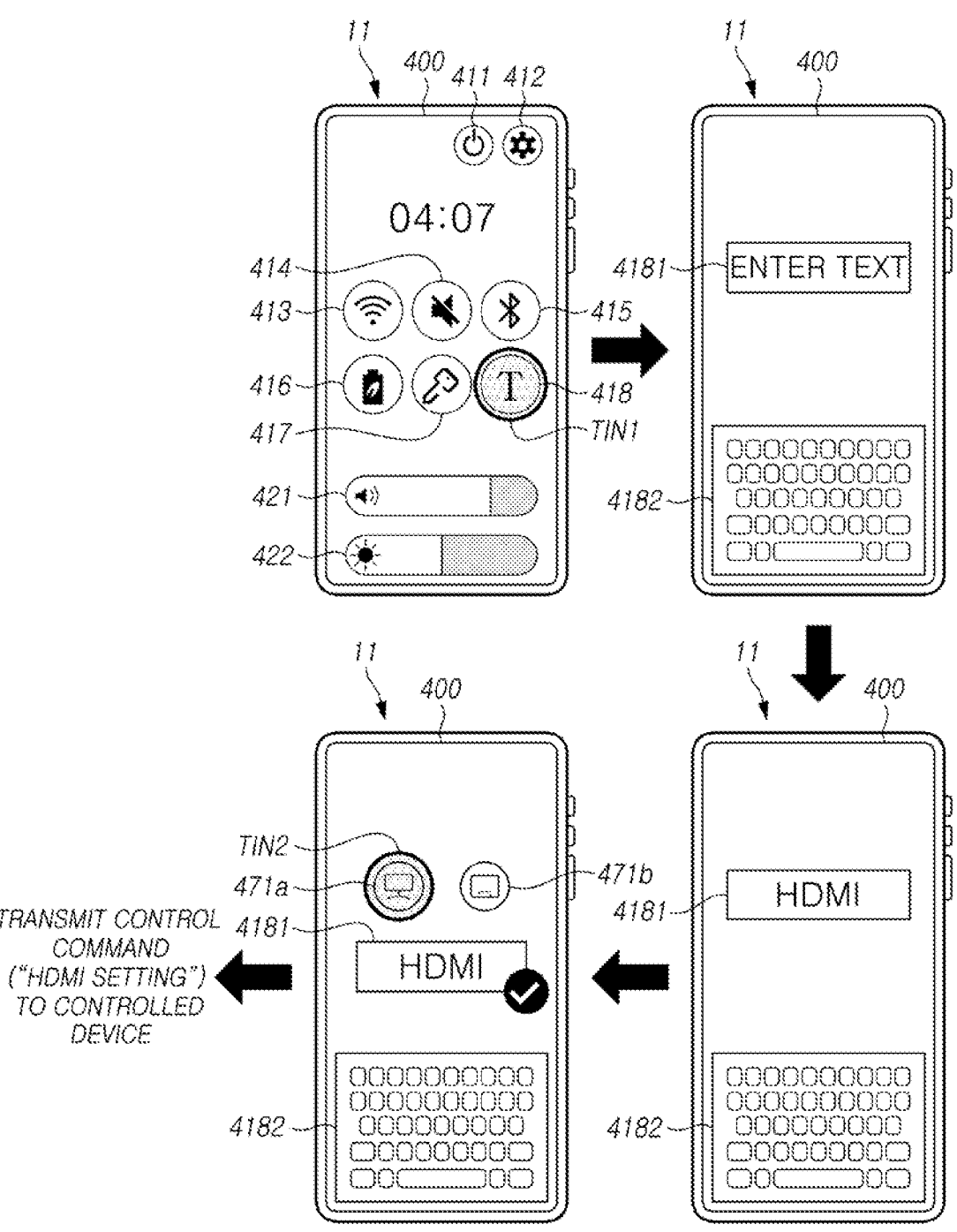
FIGS. 10A, 10B, and 10C illustrate a method for controlling a neighboring device using a text field according to an embodiment of the disclosure.
Figure 10B:
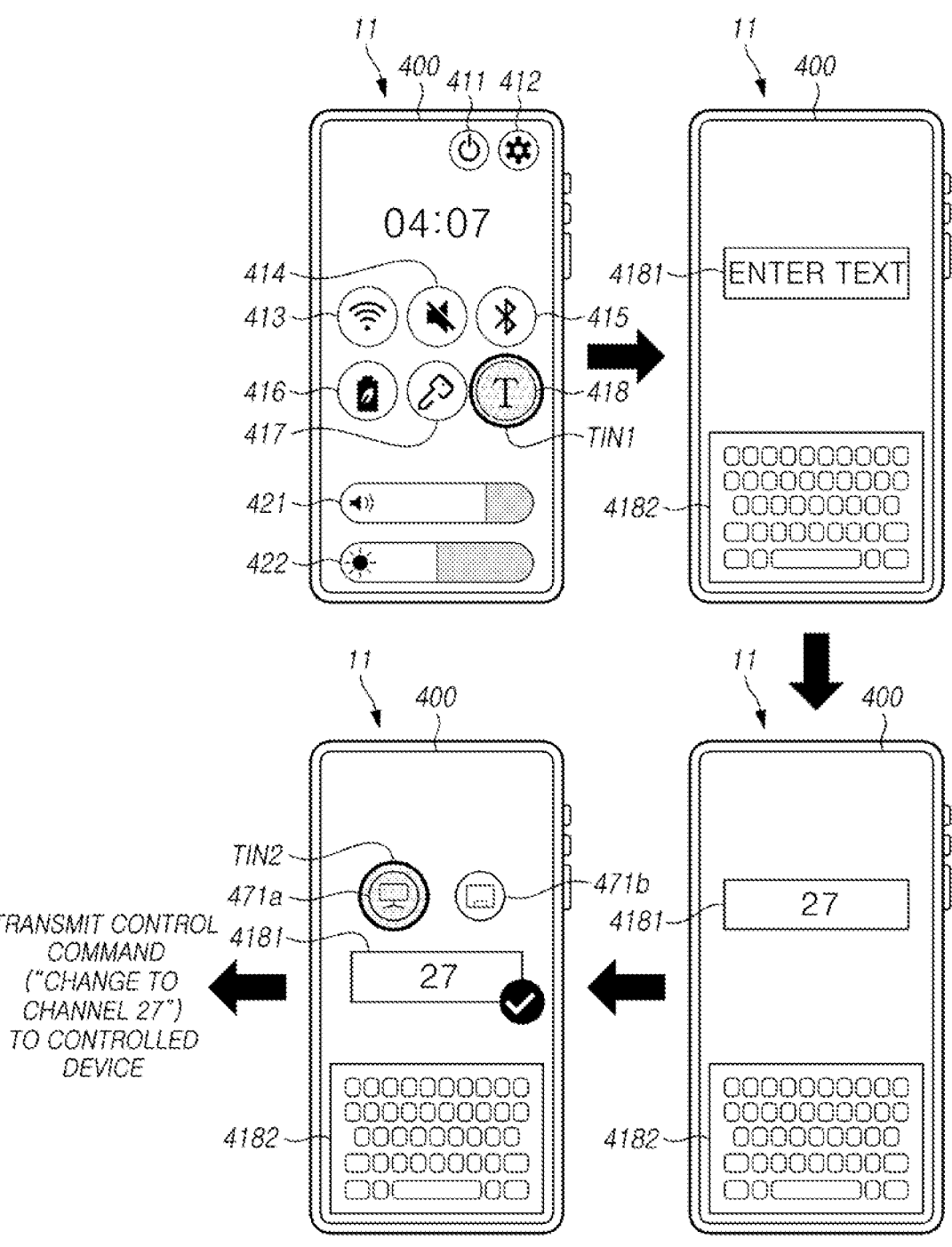
Figure 10C:
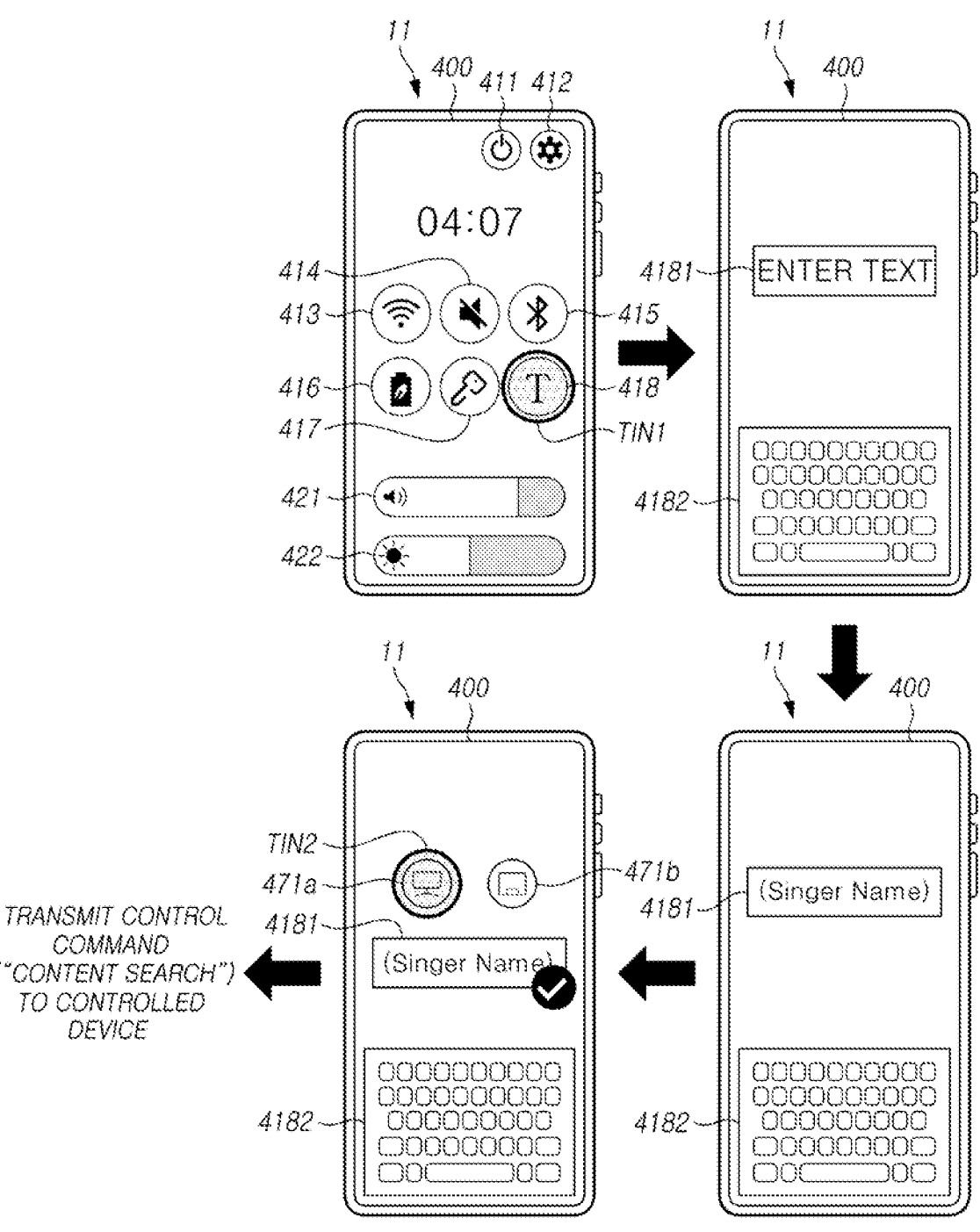

FIGS. 10A, 10B, and 10C illustrate a method for controlling a neighboring device using a text field according to an embodiment of the disclosure.

Referring to FIGS. 10A to 10C, according to an embodiment, the user interface screen 400 may be configured substantially the same as that described with reference to FIG. 4. Hereinafter, the processor 102 relates to the processor 102 provided in the mobile device 11 (e.g., a user device).

Referring to FIG. 4, the user interface screen 400 may include a plurality of first UI elements (410 and 420). The processor 102 may identify a user input to any one of the plurality of first UI elements (410 and 420).

According to an embodiment, the processor 102 may detect a user input TIN1 to a key-call button 417 which is any one of the first UI elements (410 or 420). For example, the processor 102 may detect a trigger input to the key-call button 417.

According to an embodiment, the processor 102 may display a virtual keyboard 4182 and a text field 4181 based on detecting a trigger input to the key-call button 417. The processor 102 may display a text input to the virtual keyboard 4182 on the text field 4181. Furthermore, the processor 102 may identify one or more neighboring devices 12 based on the text information input on the text field 4181.

According to an embodiment, the text information may include at least one of a parameter type text, a search type text, and/or a device function type text. The parameter type text may be composed of, e.g., Arabic numbers. The device function type text may be composed of a text type corresponding to any one of various device functions. The search type text may be composed of the remaining text types except for the parameter type text and the device function type text.

FIG. 10A illustrates an example in which device function text is inputted to the text field according to an embodiment of the disclosure.

Referring to FIG. 10A, text associated with any one of various device functions may be input to the text field 4181. For example, when "HDMI" is entered in the text field 4181, the processor 102 may identify the device function (e.g., HDMI setting) associated with the HDMI. For example, when the "power saving mode" is entered in the text field 4181, the processor 102 may identify a device function (e.g., execution of the power saving mode) associated with the power saving mode. According to an embodiment, the device function inferred using the text input may be referred to as an "expected device function."

According to an embodiment, the processor 102 may identify the neighboring device 12 capable of executing the expected device function. Further, the processor 102 may display the second UI element (441a, . . . , or 441e) corresponding to the neighboring device 12 on the display 404.

According to an embodiment, the processor 102 may determine the controlled device based on the user input TIN2 associated with the second UI element (441a, . . . , or 441e). Further, the processor 102 may transmit a control command (e.g., "HDMI setting") to the controlled device.

FIG. 10B illustrates an example in which parameter type text is inputted to a text field according to an embodiment of the disclosure.

Referring to FIG. 10B, a text composed of a parameter, e.g., an Arabic number, may be input to the text field 4181.

According to an embodiment, when the parameter type text is input to the text field 4181, the processor 102 may identify a device function associated with parameter adjustment. For example, the processor 102 may identify identification codes associated with parameter adjustment using the mapping table. Specifically, the associated identification codes may be identified based on whether the function code associated with parameter adjustment is included. Functions related to parameter adjustment may include, but are not limited to, a volume adjustment function, a brightness adjustment function, a channel change function, and the like.

According to an embodiment, the neighboring device 12 may be detected based on the identification code. Further, the second UI element (441a, . . . , or 441e) indicating the neighboring device 12 may be displayed on the display 404. According to an embodiment, the processor 102 may determine the controlled device based on the user input TIN2 associated with the second UI element (441*a*, . . . , or 441*e*). Further, the processor 102 may transmit a control command (e.g., change to channel 27) to the controlled device.

There may be various parameter adjustment-associated device functions for one neighboring device 12. For example, for a TV device, there may be various device functions that may be performed according to parameter values, such as brightness adjustment, volume adjustment, and channel adjustment. According to an embodiment, the device function to be performed by the control command may be previously defined by the user. For example, the parameter value that is a basis for transmitting a control command to the TV device in the process of controlling the neighboring device 12 using the text field 4181 may be predefined as "channel change."

FIG. 10C illustrates an example in which a search type text is inputted to a text field according to an embodiment of the disclosure.

Referring to FIG. 10C, search type text may be input into the text field 4181.

According to an embodiment, the processor 102 may determine the user intent as a search, based on a search type text being input to the text field 4181. In this case, the device function to be performed by the controlled device may be determined as a search and/or the output of the search result. According to an embodiment, the device function to be performed by the controlled device may be determined as a content search corresponding to the search type text.

The processor 102 may identify the neighboring device 12 associated with the device function. Further, the processor 102 may transmit the second UI element (441*a*, . . . , or 441*e*) corresponding to the neighboring device 12 on the display 404 and transmit a control command (e.g., "content search") to the controlled device based on a user input associated with the second UI element (441*a*, . . . , or 441*e*).

Figure 11A:
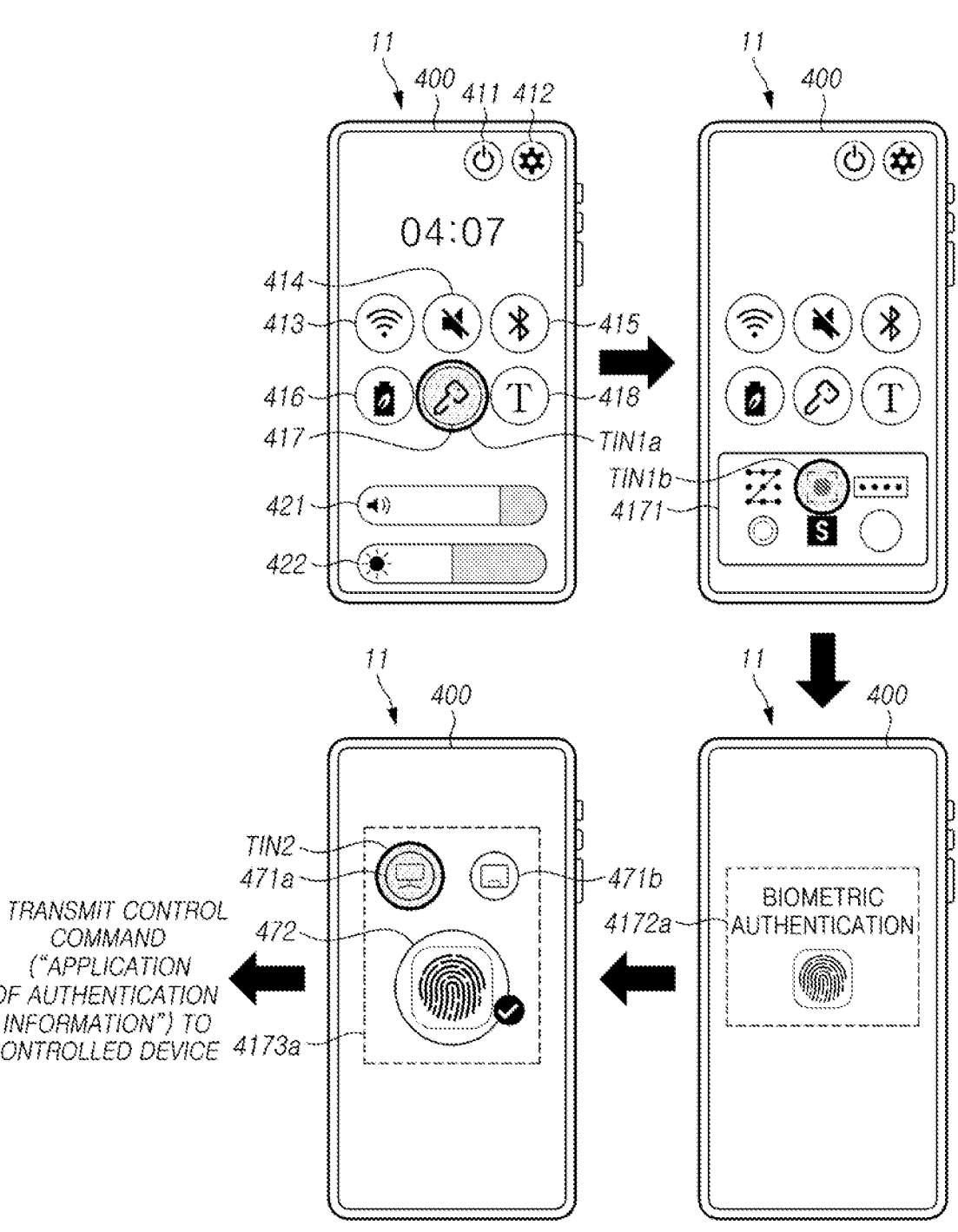
FIGS. 11A and 11B illustrate an example method for providing an authentication result to a neighboring device to an embodiment of the disclosure.
Figure 11B:
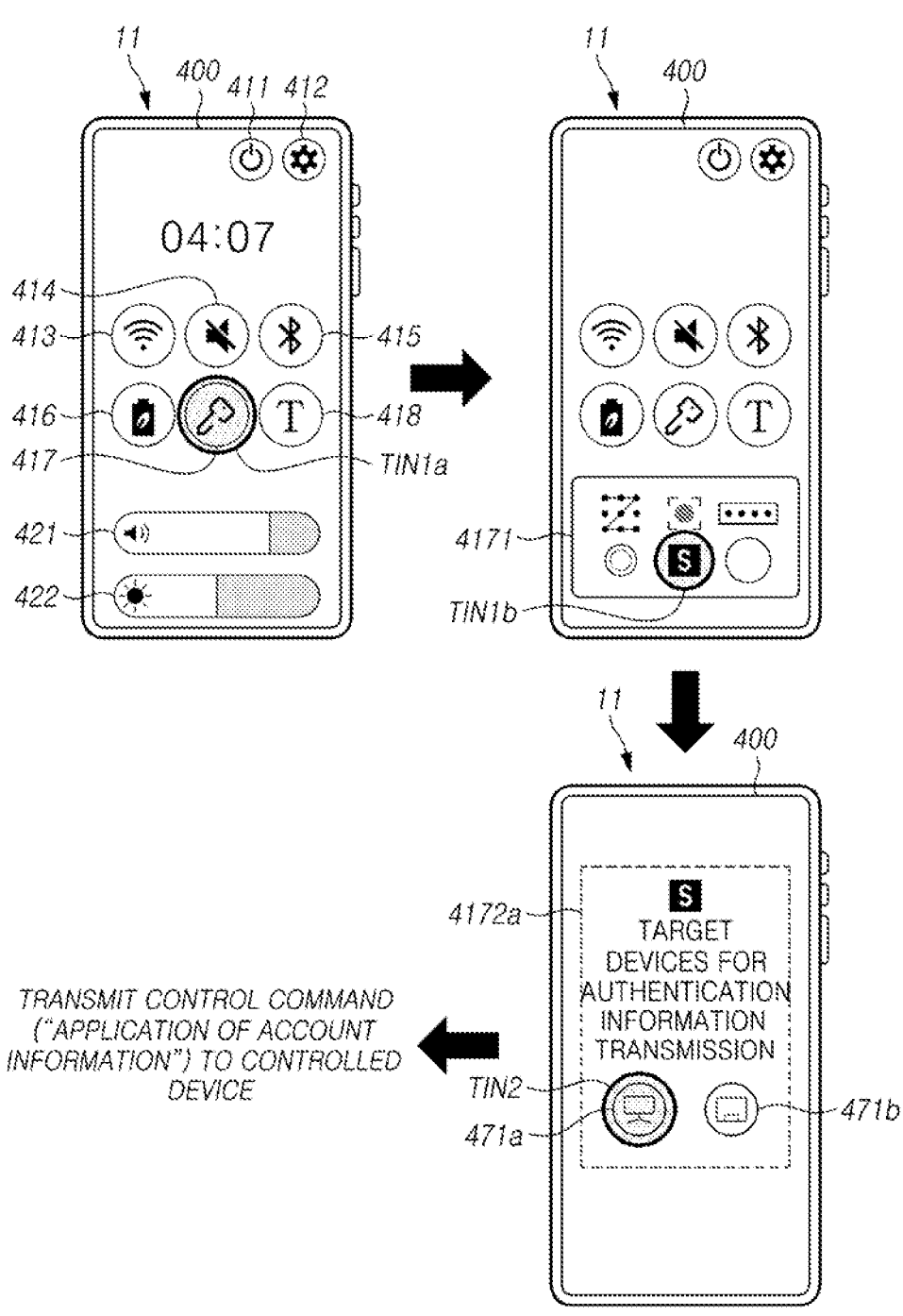

FIGS. 11A and 11B illustrate an example method for providing an authentication result to a neighboring device according to an embodiment of the disclosure.

Referring to FIGS. 11A and 11B, according to an embodiment, the user interface screen 400 may be configured substantially the same as that described with reference to FIG. 4. Hereinafter, the processor 102 relates to the processor 102 provided in the mobile device 11 (e.g., a user device).

Referring to FIG. 4, the user interface screen 400 may include a plurality of first UI elements (410 and 420). The processor 102 may identify a user input to any one of the plurality of first UI elements (410 and 420).

According to an embodiment, the processor 102 may detect a user input TIN1*a* to an authentication button 417 which is any one of the first UI elements 410 or 420. For example, the processor 102 may detect a trigger input to the authentication button 417.

According to an embodiment, the processor 102 may invoke an authentication menu 4171 based on detecting the user input TIN1*a* to the authentication button 417. The authentication menu 4171 may be shown on the user interface screen 400.

According to an embodiment, the authentication menu 4171 may include a first option(s) indicating one or more authentication methods (e.g., pattern authentication, fingerprint authentication, and password authentication) and a second option(s) indicating one or more authentication targets (e.g., a service application including an OTT application and a search engine application).

FIG. 11A illustrates an example in which a user input is applied to the first option according to an embodiment of the disclosure.

According to an embodiment, when detecting a user input TIN1*b* to the first option, the processor 102 may display an execution screen 4172*a* for authentication on the display 404. For example, in the case of fingerprint recognition, an execution screen 4172*a* for fingerprint recognition may be displayed on the display 404. For example, in the case of pattern recognition, an execution screen for pattern recognition may be displayed on the display 404.

According to an embodiment, based on the authentication (e.g., user authentication) being successful, the processor 102 may identify the neighboring device 12 to which the authentication result (authentication information) 472 is to be transmitted. Although not limited thereto, the neighboring device 12 to receive the authentication result 472 may be identified based on state information (e.g., authentication standby) received through the transceiver 103. For example, the neighboring device 12 to receive the authentication result 472 may be a device operating in an authentication standby state and may be identified as a device wired/wirelessly outputting an authentication standby signal.

According to an embodiment, the processor 102 may display a window 4173*a* which includes the second UI elements 471*a* and 471*b* indicating the neighboring device 12 on the display 404. Further, when a user input TIN2 to the second UI elements 471*a* and 471*b* is received, a control command (e.g., "application of authentication information") may be transmitted to the controlled device. The control command may include authentication information including the authentication result.

FIG. 11B illustrates an example in which a user input is applied to the second option according to an embodiment of the disclosure.

When the user input TIN1*a* to the second option is detected, the processor 102 may display a window 4172*a* for determining the device to receive account information on the display 404. The account information may include account information about a service (e.g., account information about a Samsung TV). The mobile device 11 may store account information in the memory 101.

According to an embodiment, the window 4172*a* for determining the neighboring device 12 to receive the account information may include second UI elements 471*a* and 471*b*. Further, when receiving a user input TIN2 to the second UI elements 471*a* and 471*b*, the processor 102 may transmit a control command (e.g., "application of authentication information") to the controlled device. The control command may include account information.

Referring back to FIGS. 11A and 11B, according to an embodiment, the neighboring devices 12 represented as the second UI elements 471*a* and 471*b* may operate in a control standby state (e.g., an authentication standby state) until receiving a control command. Also, although not limited thereto, the neighboring device 12 may be an XR device (e.g., AR glasses and HMD). The XR device may sense the front view through one or more sensors. In an example, the XR device may operate in an authentication standby state based on identifying the mobile device 11 from the front view, but the disclosure is not limited thereto.

Figure 12:
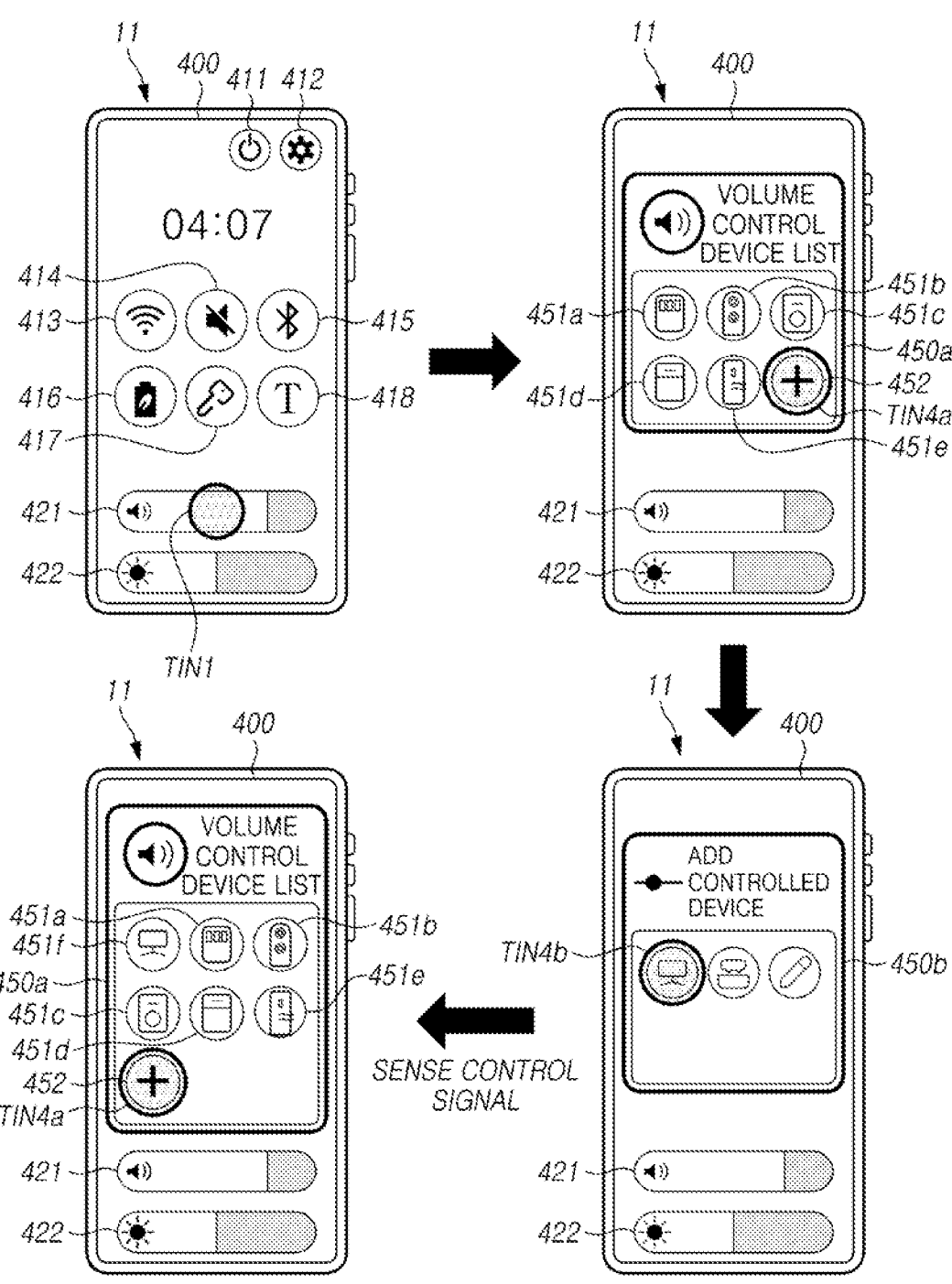
FIG. 12 illustrates an example method for modifying a configuration of a window according to an embodiment of the disclosure.

FIG. 12 illustrates an example method for modifying a configuration of a window according to an embodiment of the disclosure.

Referring to FIG. 12, according to an embodiment, the user interface screen 400 may be configured substantially the same as that described with reference to FIG. 4. Furthermore, as a case where a user input TIN1 and a trigger input to the first UI element 410 or 420 are detected, a window 450a for transmitting a control command to the neighboring device 12 may be displayed on the display 404. The window 450a illustrated in FIG. 12 is illustrated as a modal-type window, but is not limited thereto, and an insertion UI element 452 to be described below may be further included in a map-type window, a list-type window, and a bar-type window, and it may be applied in substantially the same manner.

Hereinafter, the processor 102 relates to the processor 102 provided in the mobile device 11 (e.g., a user device).

According to an embodiment, the window (e.g., a modal-type window) may include a plurality of second UI elements (441a, . . . , 441e). Further, the window 450a may further include an insertion UI element 452.

According to an embodiment, when detecting a user input TIN4a to the insertion UI element 452, the processor 102 may display a dependent window 450b for adding a new second UI element to the window 450a. The dependent window 450b may include candidate UI elements. The candidate UI element indicates a candidate device that may be added as a neighboring device 12.

According to an embodiment, when detecting a user input TIN4b to the candidate UI element, the processor 102 may receive or sense a control signal from the candidate device for a predefined period of time. Whenever the control state changes, the candidate device may transmit a control signal for indicating the change to the mobile device 11. The mobile device 11 may monitor the change in the state of the candidate device by receiving the control signal.

According to an embodiment, the processor 102 may add a candidate UI element, as a second UI element 451f, to the window when receiving or sensing a control signal (e.g., volume adjustment of the TV device) from the candidate device. According to an embodiment, when the function code associated with the control signal received from the candidate device is substantially the same as the function code associated with the previously selected first UI element 410 or 420, the processor 102 may add the candidate UI element to the window as the second UI element, but the disclosure is not limited thereto.

As such, the mobile device 11 may set the candidate device as the neighboring device 12. The new second UI element 451f to be added may be disposed in the highest priority immediately after being added but is not limited thereto.

Figure 13:
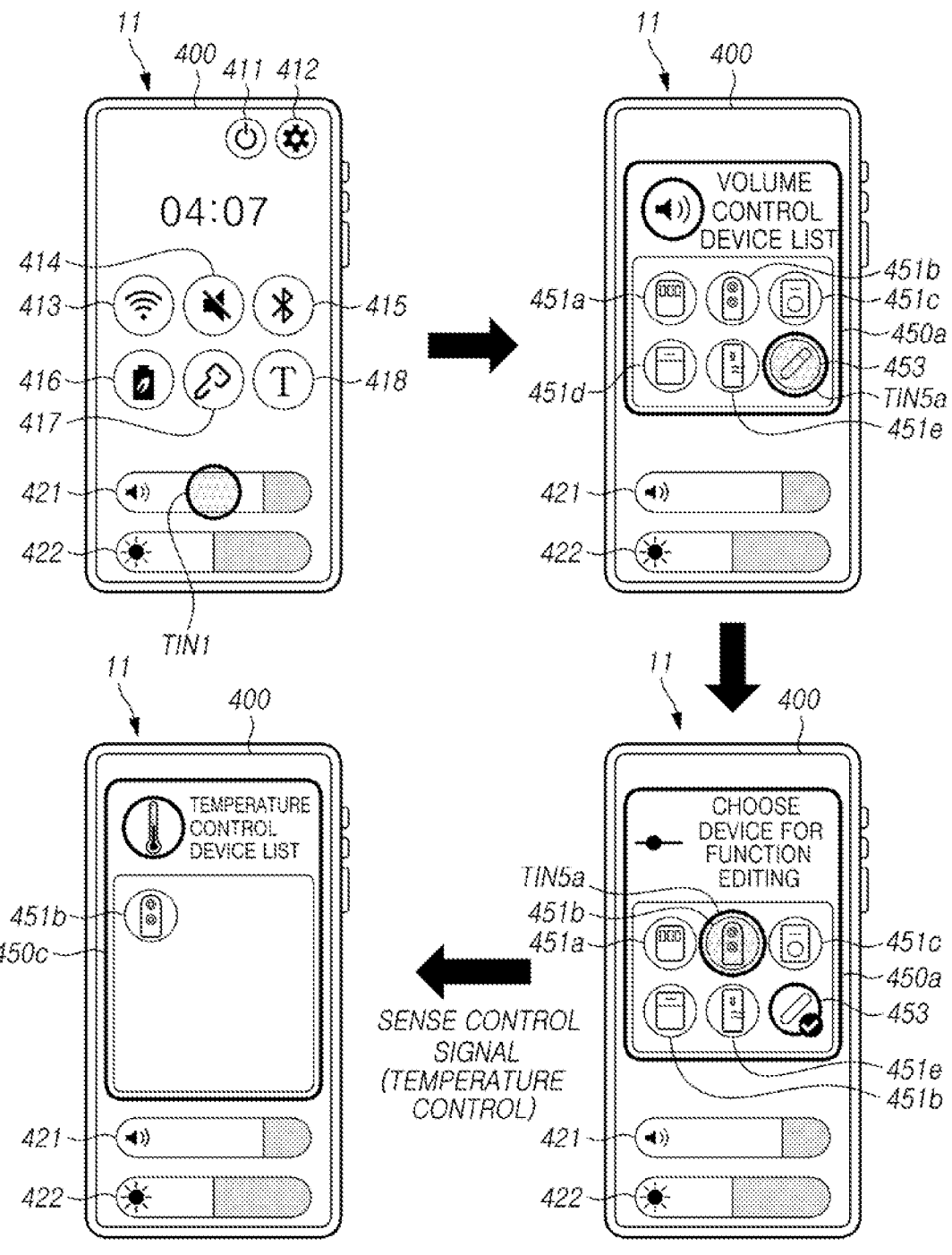
FIG. 13 illustrates an example method for changing a device function associated with a first UI element according to an embodiment of the disclosure.

FIG. 13 illustrates an example method for changing a device function associated with a first UI element (410 or 420) of FIG. 4.

Referring to FIG. 13, according to an embodiment, the user interface screen 400 may be configured substantially the same as that described with reference to FIG. 4. Furthermore, as a case where a user input TIN1 and a trigger input to the first UI element (410 or 420) are detected, a window for transmitting a control command to the neighboring device 12 may be displayed on the display 404. The window 450a illustrated in FIG. 12 is illustrated as a modal-type window, but is not limited thereto, and an edit UI element 453 to be described below may be further included in a map-type window, a list-type window, and a bar-type window, and it may be applied in substantially the same manner.

Hereinafter, the processor 102 relates to the processor 102 provided in the mobile device 11 (e.g., a user device).

According to an embodiment, the window (e.g., a modal-type window) 450a may include a plurality of second UI elements (441a, . . . , 441e). Further, the window 450a may further include an edit UI element 453.

According to an embodiment, when a user input TIN5a to the edit UI element 453 is detected, the processor 102 may display a dependent window 450b for editing the device function associated with the first UI element (410 or 420). The dependent window 450b may include candidate UI elements. The candidates UI element may be determined as at least some of the second UI elements (451a, . . . , 451e) corresponding to the neighboring device 12 to receive or sense the control signal.

According to an embodiment, the processor 102 may detect a user input to the candidate UI element. When detecting a user input TIN5b to the candidate UI element, the processor 102 may receive or sense a control signal from the neighboring device 12 corresponding to the candidate UI element for a predefined period of time. Whenever the control state changes, the neighboring device 12 may transmit a control signal for indicating the change to the mobile device 11. The mobile device 11 may monitor the change in the state of the neighboring device 12 by receiving the control signal.

According to an embodiment, when receiving or sensing a control signal (e.g., temperature control) from the neighboring device 12, the processor 102 may associate the device function associated with the control signal with the first UI element (410 or 420). In other words, the device function of the control signal received or sensed from the neighboring device 12 may be mapped to the first UI element (410 or 420). Accordingly, the mapping table may also be updated.

As described above, after the mapping table is updated, when a user input TIN1 and/or a trigger input is applied to the same first UI element (410 or 420), the processor 102 may identify neighboring devices 12 associated with the newly mapped device function (e.g., temperature control), and may display the second UI elements indicating the neighboring devices 12 on the window.

In various embodiments of the disclosure, the embodiments described with reference to FIGS. 5A to 13 may be substantially equally applied even when the wireless device is a watch-type wireless terminal or a glasses-type wireless terminal. For example, the watch-type wireless terminal may control neighboring devices based on inputs to the first UI element displayed on the display of the watch-type wireless terminal or inputs to the second UI element and/or third UI element. For example, the glasses-type wireless terminal may control neighboring devices based on inputs to the first UI element displayed on the display of the glasses-type wireless terminal and inputs to the second UI element.

The electronic device according to various embodiments may be one of various types of electronic devices. The electronic devices may include, for example, a display device, a portable communication device (e.g., a smartphone), a computer device, a portable multimedia device, a portable medical device, a camera, a wearable device, or a home appliance. The electronic devices according to an embodiment are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the tem 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". Apart or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the mobile device 11 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of controlling a neighboring device by a mobile device, the method comprising:

displaying a user interface (UI) screen which includes a plurality of UI elements;

detecting a first user input associated with a first UI element among the plurality of UI elements, the first UI element being associated with a device function;

identifying one or more identification codes associated with the first UI element based on the detecting of the first user input;

detecting one or more neighboring devices based on the one or more identification codes, the one or more neighboring devices corresponding respectively to the one or more identification codes, and each of the one or more neighboring devices having the device function;

displaying a window which includes one or more UI elements associated with the one or more neighboring devices;

detecting a second user input associated with a second UI element among the one or more UI elements;

determining, based on the detecting of the second user input, a neighboring device corresponding to the second UI element, among the one or more neighboring devices, as a controlled device; and transmitting a control command related to the first UI element to the neighboring device determined as the controlled device.

2. The method of claim 1, wherein each of the one or more identification codes includes a device code, a function code, and a mapping code, wherein the device code is a code for identifying a corresponding device among the one or more neighboring devices, wherein the function code is a code associated with the device function.

3. The method of claim 2, wherein, in case that a number of the one or more neighboring devices is multiple, function codes of the multiple neighboring devices are the same, and device codes of the multiple neighboring devices are different.

4. The method of claim 2, wherein the mapping code is associated with a component type of the first UI element.

5. The method of claim 1, further comprising performing a device function corresponding to the first UI element based on detecting a third user input associated with the first UI element, wherein the third user input is different from the first user input.

6. The method of claim 1, wherein the window is any one of a map-type window, a modal-type window, a bar-type window, or a list-type window.

7. The method of claim 6, wherein, based on the window being the map-type window, the one or more UI elements are displayed on the map-type window, and wherein one or more display positions of the one or more UI elements on the map-type window are determined based on at least one of one or more distances between the mobile device and the one or more neighboring devices or one or more positions of the one or more neighboring devices.

8. The method of claim 7, wherein the first UI element at least partially overlaps the map-type window.

9. The method of claim 7, wherein the map-type window includes a plurality of iso-level lines, and wherein the first UI element is positioned in a center of the plurality of iso-level lines.

10. The method of claim 7, further comprising identifying the one or more distances between the mobile device and the one or more neighboring devices or the one or more positions of the one or more neighboring devices, through an inertial measurement unit (IMU) sensor and a transceiver included in the mobile device.

11. The method of claim 6, wherein based on the window being any one of the modal-type window, the bar-type window, or the list-type window, the one or more UI elements are arranged based on one or more priorities of the one or more UI elements, and wherein the one or more priorities of the one or more UI elements are determined based on at least one of one or more distances between the mobile device and the one or more neighboring devices or one or more positions of the one or more neighboring devices.

12. The method of claim 11, wherein a badge indicating a number of devices associated with at least one UI element of the one or more UI elements is coupled to the at least one UI element.

13. The method of claim 12, further comprising determining one or more neighboring devices associated with a third UI element among the at least one UI element to which the badge is coupled, as one or more controlled devices controllable through the third UI element, based on detecting a fourth user input associated with the third UI element.

14. The method of claim 12, further comprising displaying an additional list-type window for indicating at least some of one or more neighboring devices associated with a third UI element among the at least one UI element to which the badge is coupled, based on detecting a fifth user input associated with the third UI element.

15. A mobile device, comprising:
a display,
one or more memories,
one or more transceivers, and
one or more processors configured to:
  control the display to display a user interface (UI) screen which includes a plurality of UI elements;
  detect a first user input associated with a first UI element among the plurality of UI elements, the first UI element being associated with a device function;

identify one or more identification codes associated with the first UI element based on the detecting of the first user input;
  detect one or more neighboring devices based on the one or more identification codes, the one or more neighboring devices corresponding respectively to the one or more identification codes, and each of the one or more neighboring devices having the device function;
  control the display to display a window which includes one or more UI elements associated with the one or more neighboring devices;
  detect a second user input associated with a second UI element among the one or more UI elements;
  determine a neighboring device corresponding to the second UI element, among the one or more neighboring devices, as a controlled device, based on the detecting of the second user input; and
  control the one or more transceivers to transmit a control command related to the first UI element to the neighboring device determined as the controlled device.

16. The mobile device of claim 15, wherein each of the one or more identification codes include a device code, a function code, and a mapping code,
  wherein the device code is a code for identifying a corresponding device among the one or more neighboring devices,
  wherein the function code is a code associated with the device function.

17. The mobile device of claim 16, wherein the mapping code is associated with a component type of the first UI element.

18. The mobile device of claim 15, wherein the one or more processors are configured to perform a device function corresponding to the first UI element based on detecting a third user input associated with the first UI element, different from the first user input.

19. The mobile device of claim 15, wherein the window is any one of a map-type window, a modal-type window, a bar-type window, or a list-type window.

20. The mobile device of claim 19, wherein, based on the window being the map-type window, the one or more UI elements are displayed on the map-type window, and
  wherein one or more display positions of the one or more UI elements on the map-type window are determined based on at least one of one or more distances between the mobile device and the one or more neighboring devices or one or more positions of the one or more neighboring devices.

* * * * *